Figure 1:
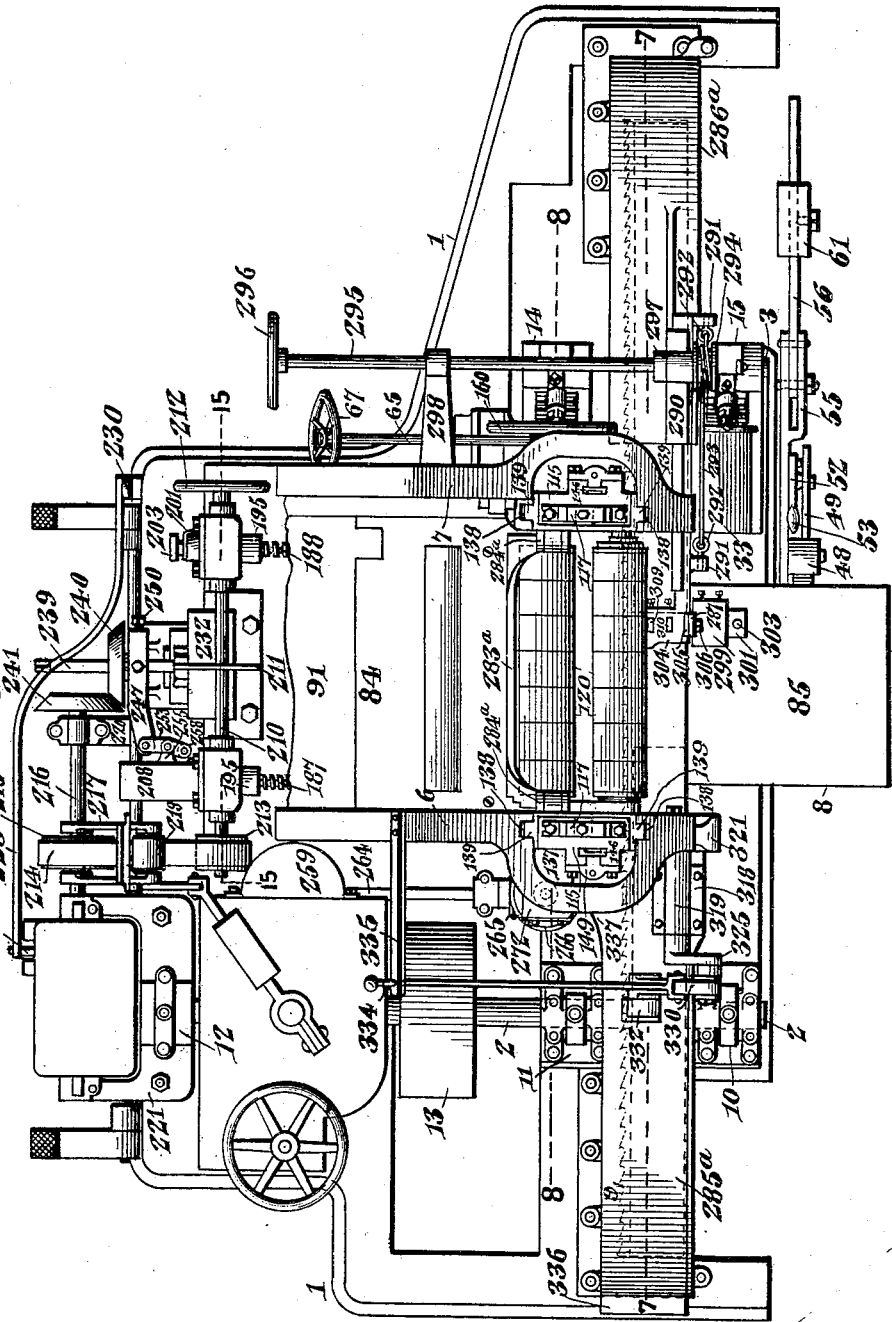

F. T. McDONOUGH.
HORIZONTAL BAND RESAWING MACHINE.
APPLICATION FILED MAR. 20, 1907.

935,805.

Patented Oct. 5, 1909.
20 SHEETS—SHEET 4.

Witnesses
Jas. F. McCathran
J. F. Riley

Francis T. McDonough, Inventor

By C. G. Siggers
Attorney

F. T. McDONOUGH.
HORIZONTAL BAND RESAWING MACHINE.
APPLICATION FILED MAR. 20, 1907.

935,805.

Patented Oct. 5, 1909.
20 SHEETS—SHEET 6.

Fig. 6.

Witnesses
Jas. F. McCathran
H. F. Riley

Francis T. McDonough,
Inventor

By E. G. Siggers
Attorney

F. T. McDONOUGH.
HORIZONTAL BAND RESAWING MACHINE.
APPLICATION FILED MAR. 20, 1907.

935,805.

Patented Oct. 5, 1909.
20 SHEETS—SHEET 7.

Witnesses
Jas. K. McCathran
Lewis Eberly

Inventor
Francis T. McDonough
By C. G. Siggers
Attorney

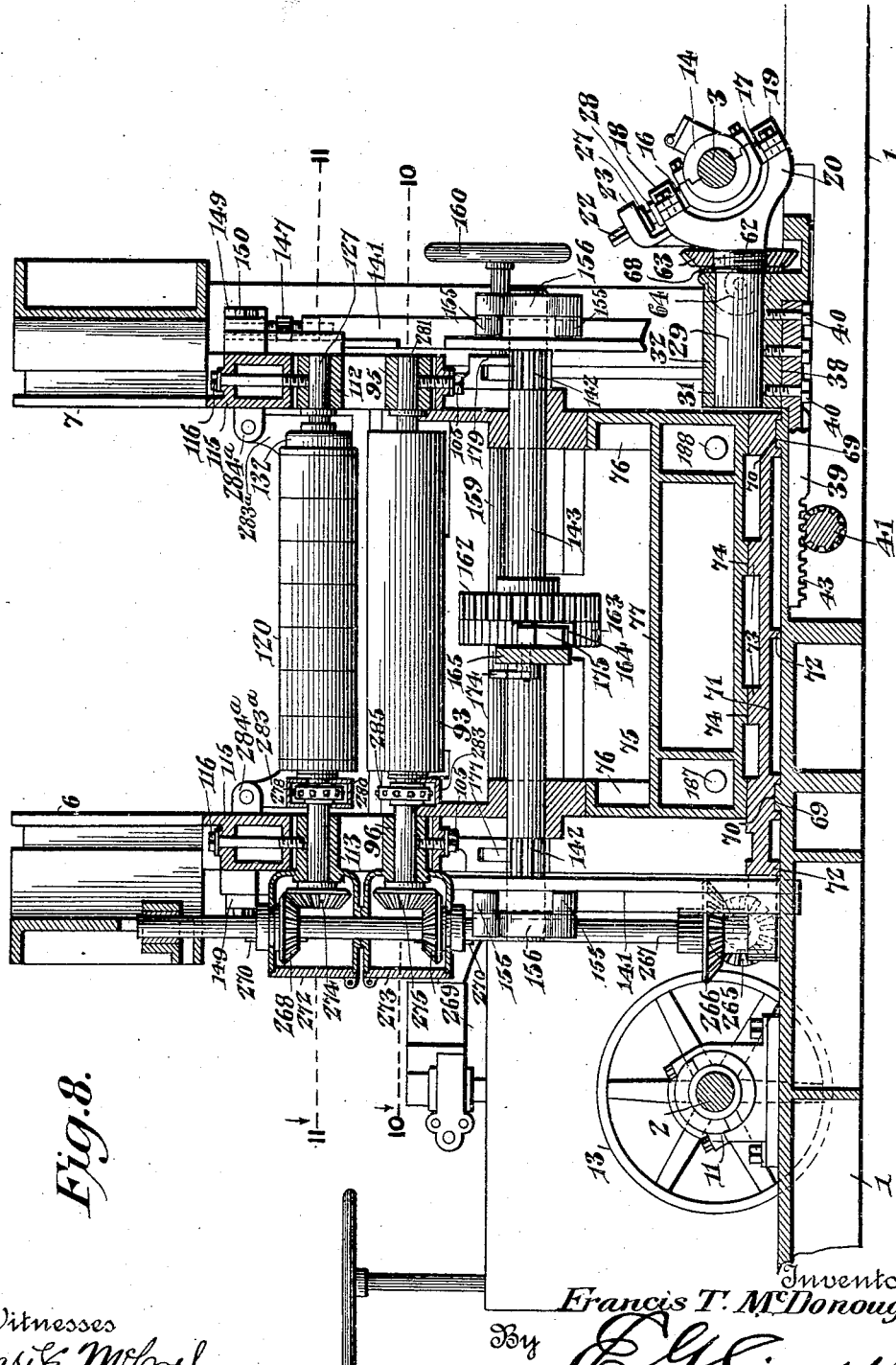

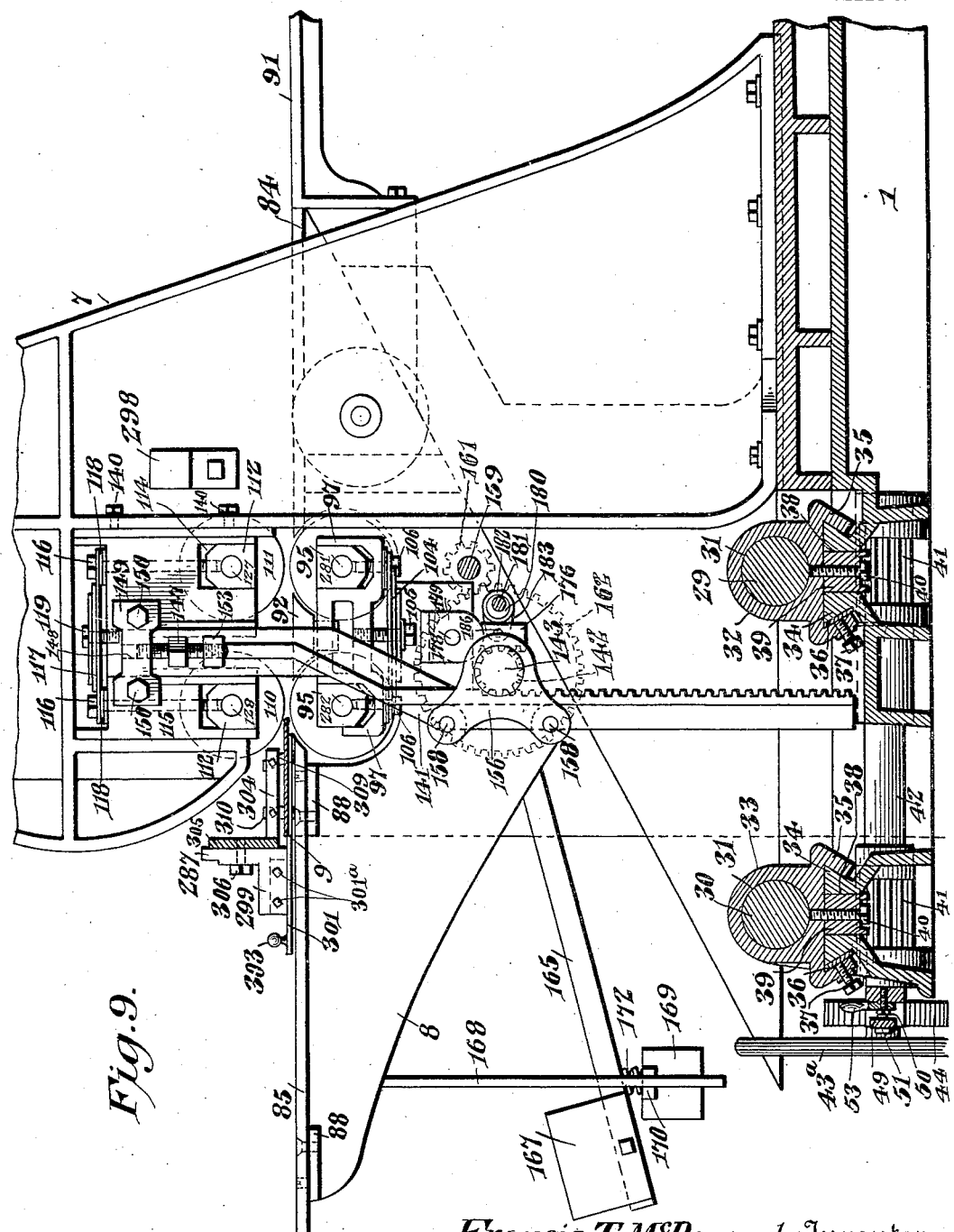

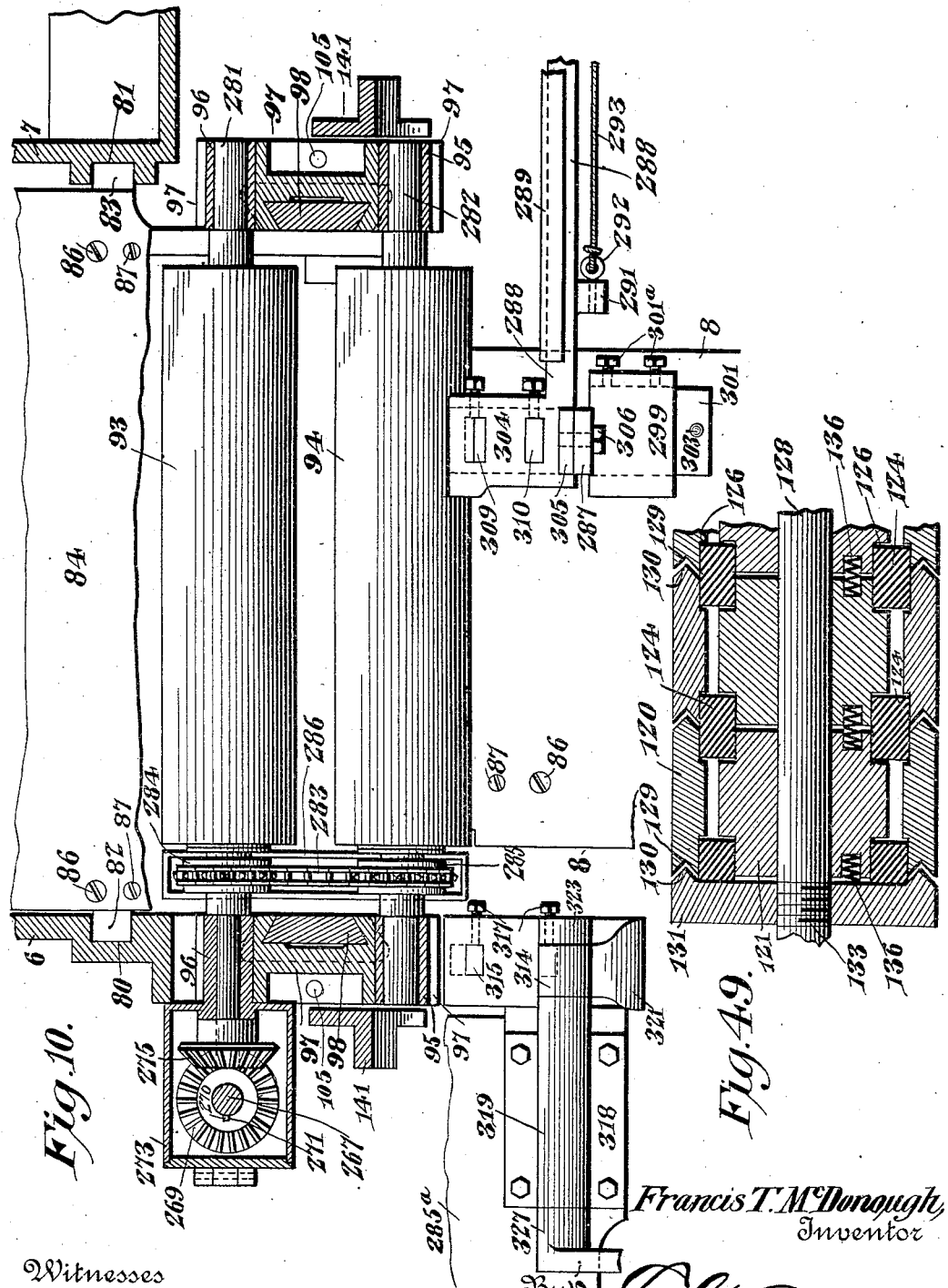

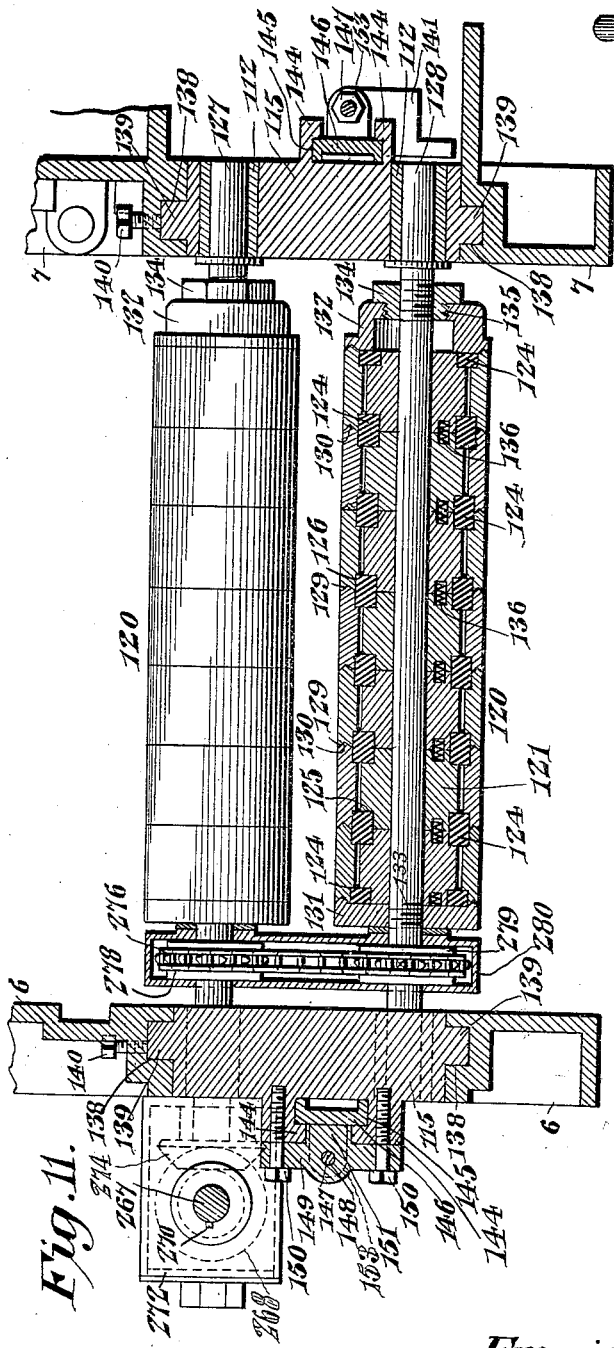

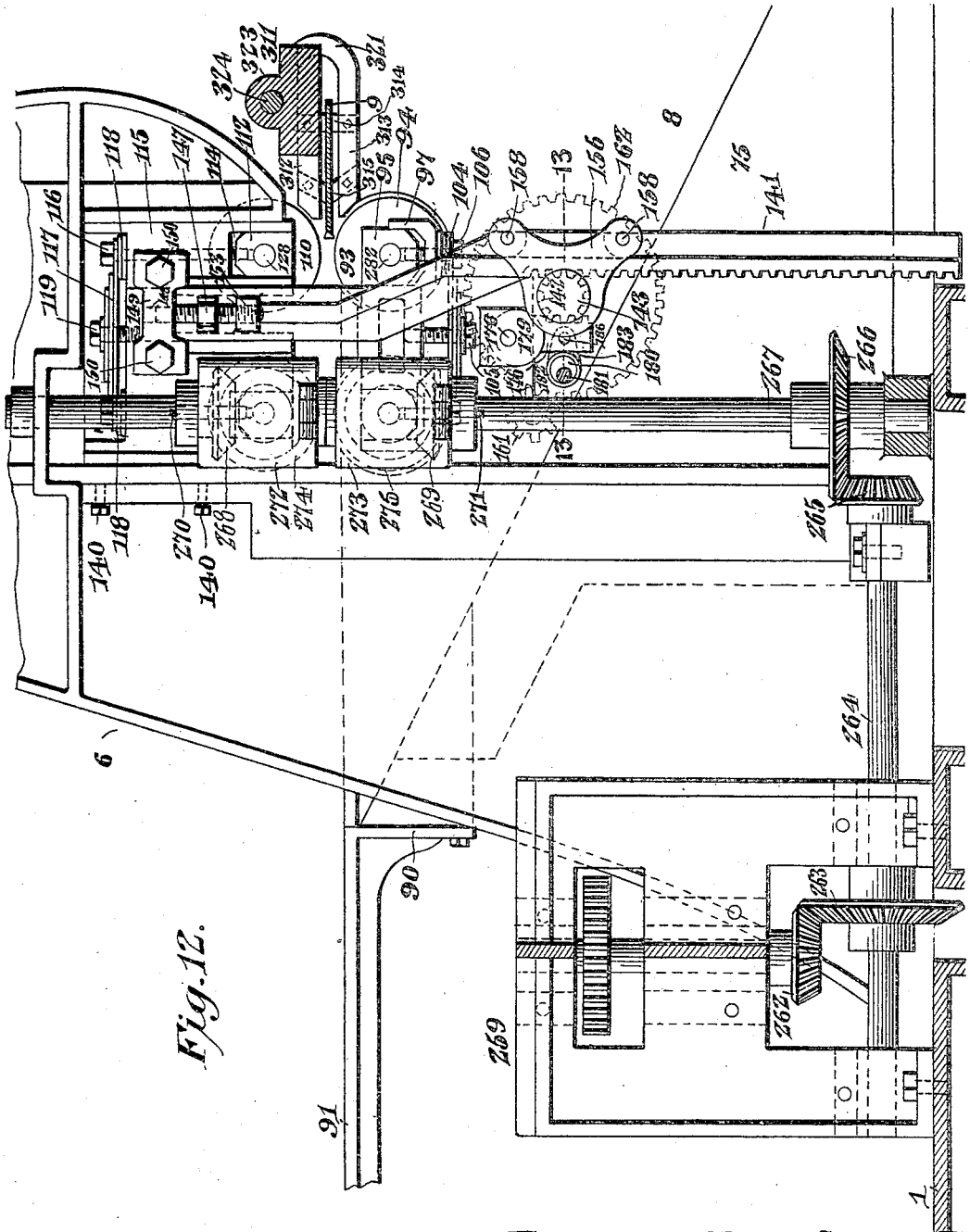

F. T. McDONOUGH.
HORIZONTAL BAND RESAWING MACHINE.
APPLICATION FILED MAR. 20, 1907.
935,805.
Patented Oct. 5, 1909.
20 SHEETS—SHEET 13.
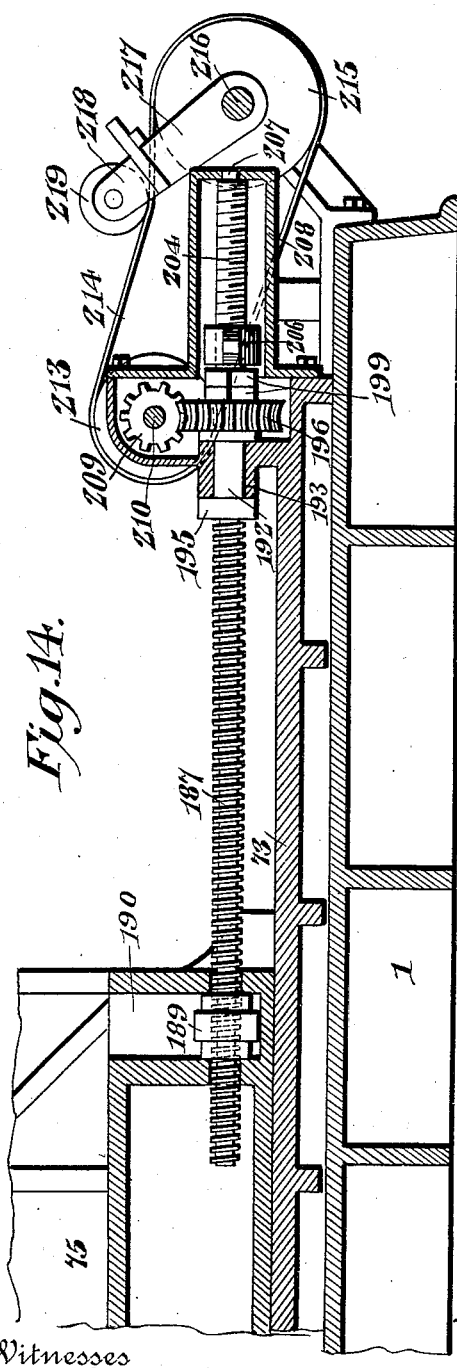
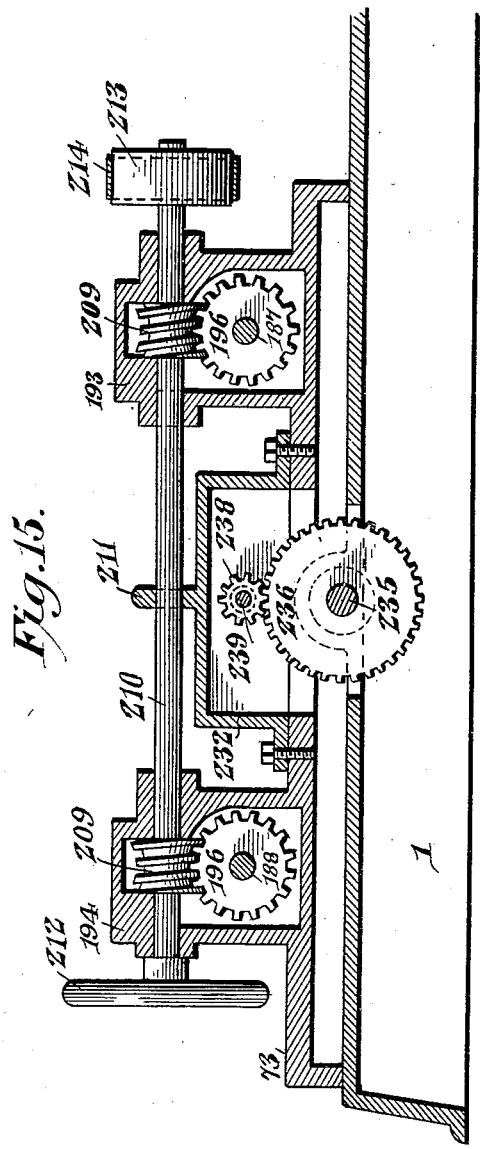
Francis T. McDonough, Inventor F. T. McDONOUGH.
HORIZONTAL BAND RESAWING MACHINE.
APPLICATION FILED MAR. 20, 1907.
935,805.
Patented Oct. 5, 1909.
20 SHEETS—SHEET 14.
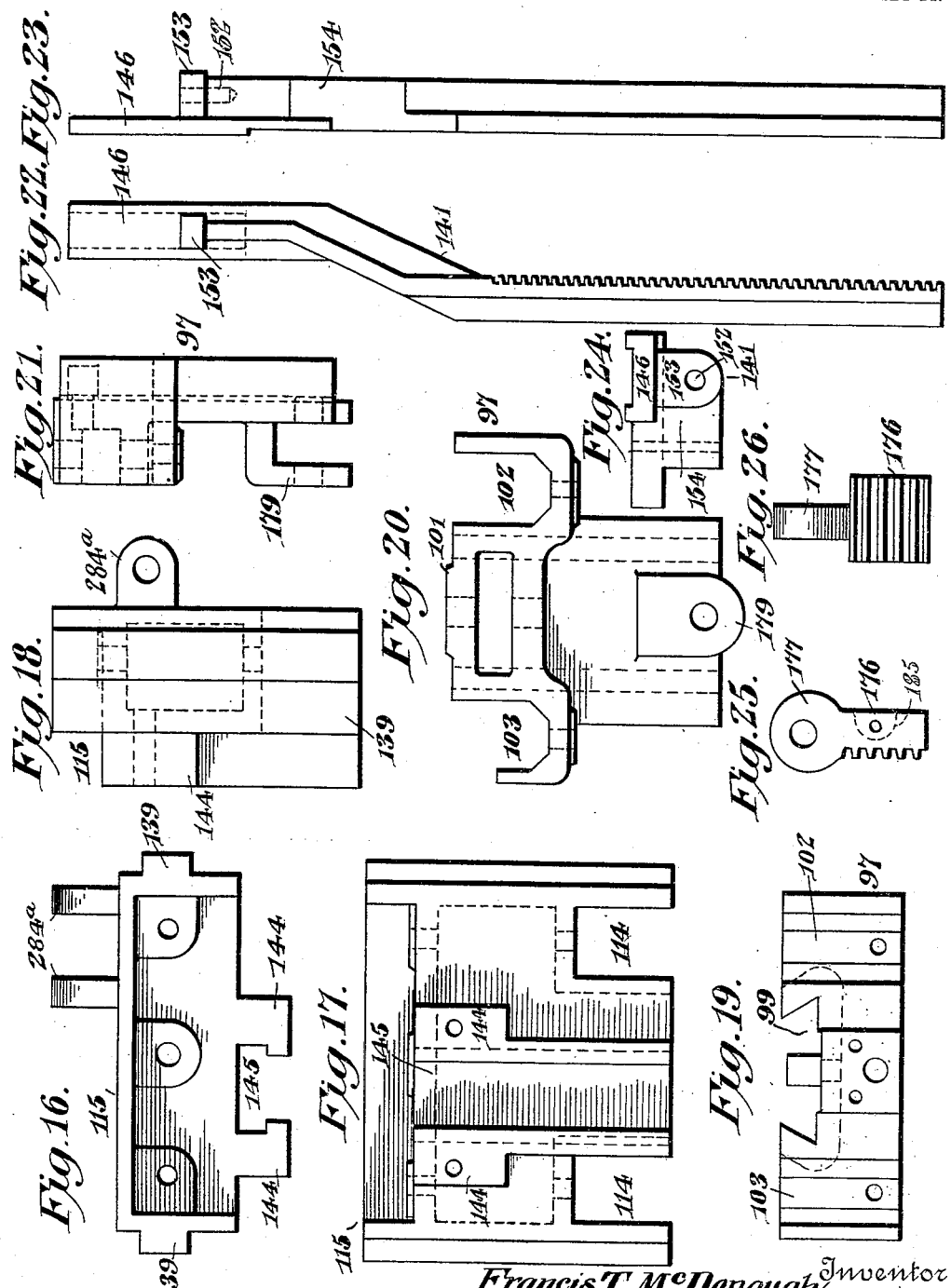

F. T. McDONOUGH.
HORIZONTAL BAND RESAWING MACHINE.
APPLICATION FILED MAR. 20, 1907.
935,805.
Patented Oct. 5, 1909.
20 SHEETS—SHEET 15.
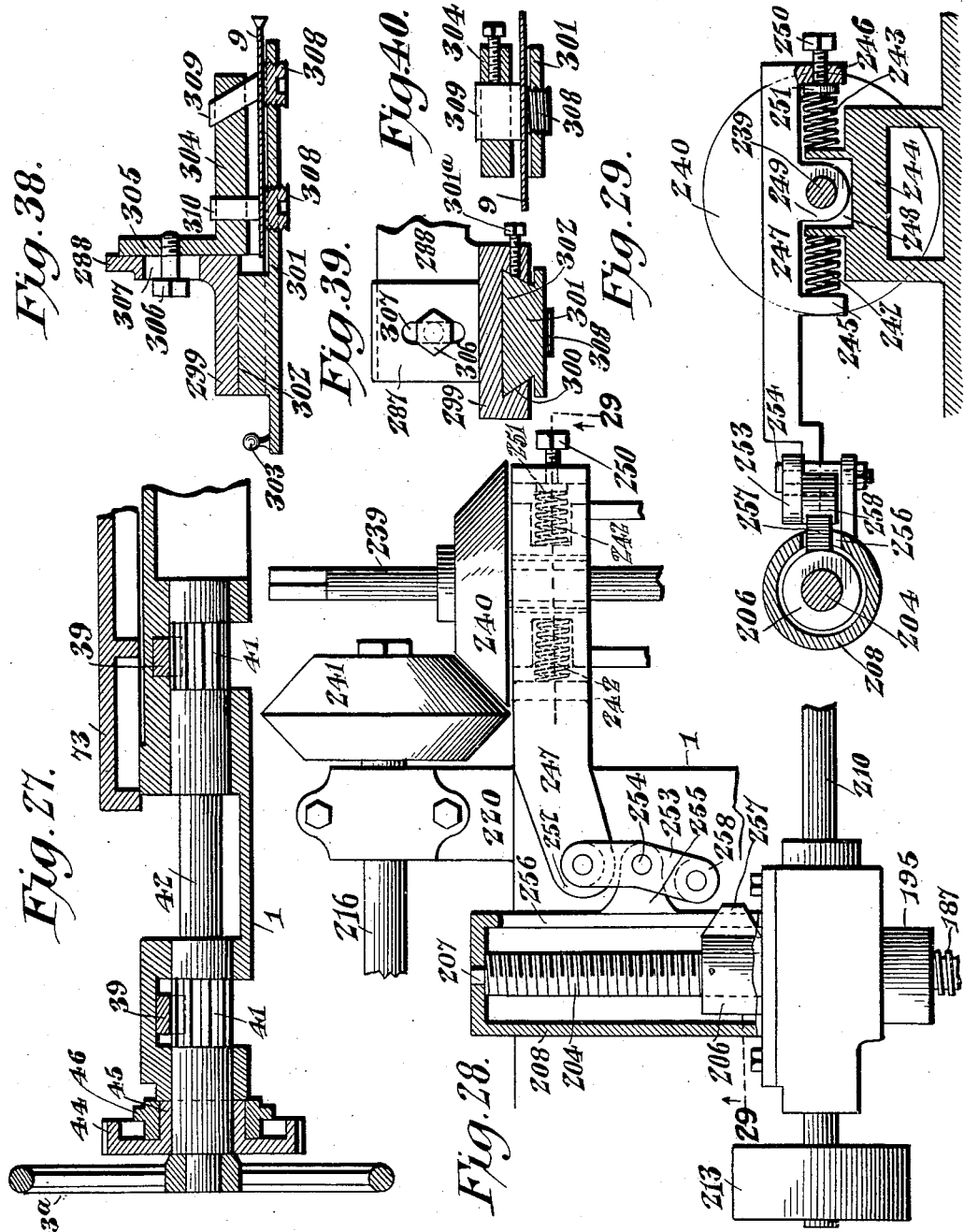
Francis T. M°Donough, Inventor
Witnesses
Jas. F. McCathran
H. F. Riley
By E. G. Siggers
Attorney

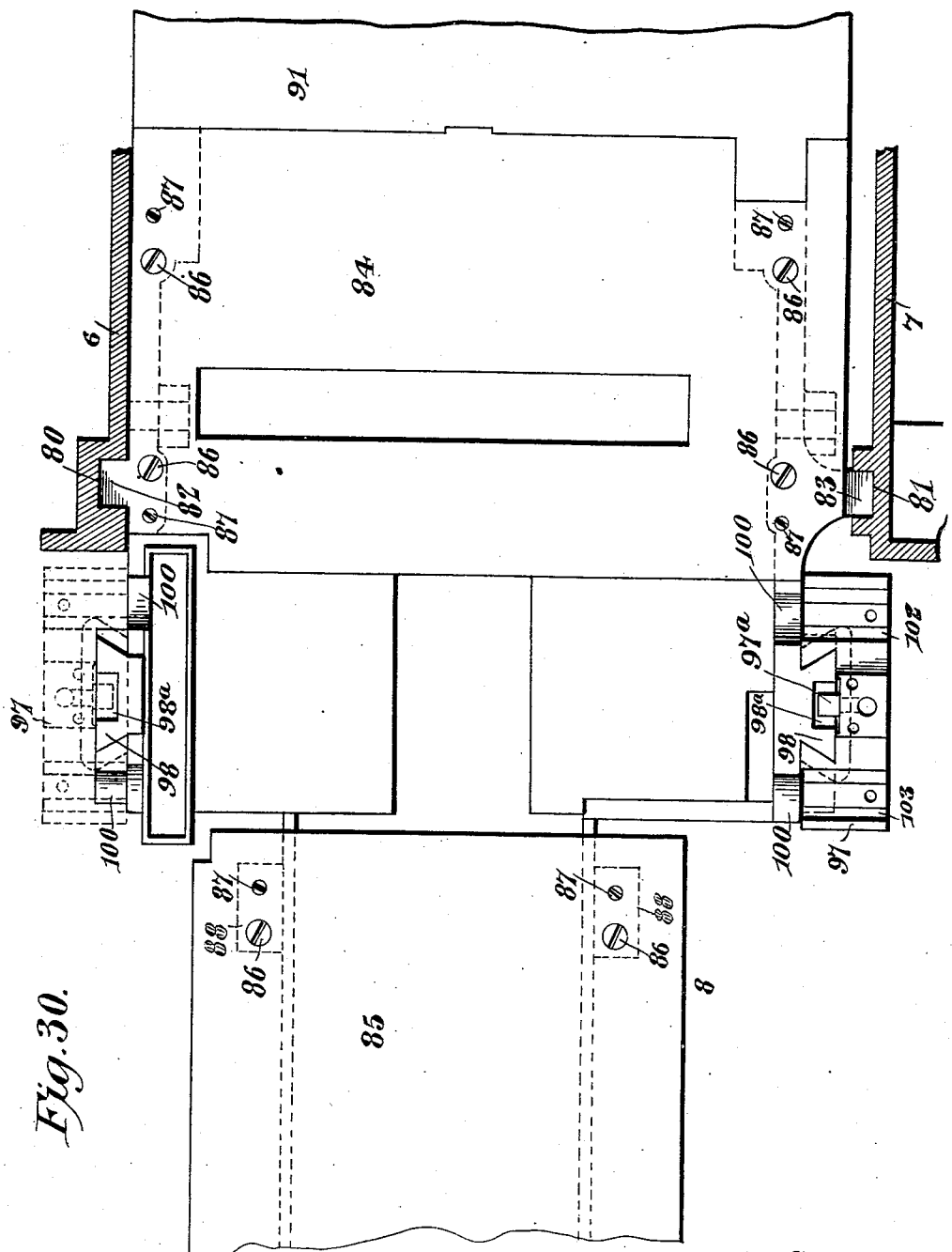

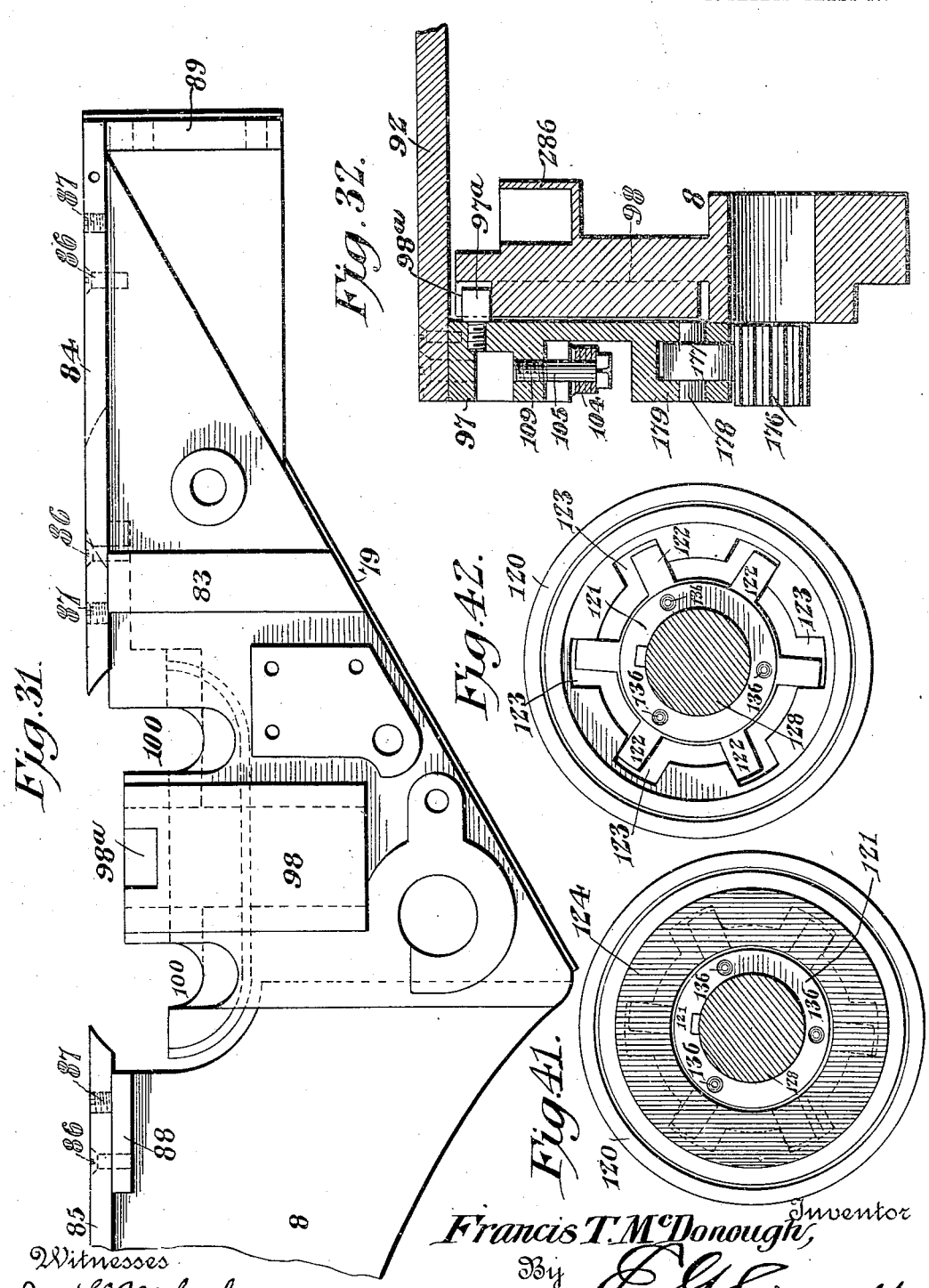

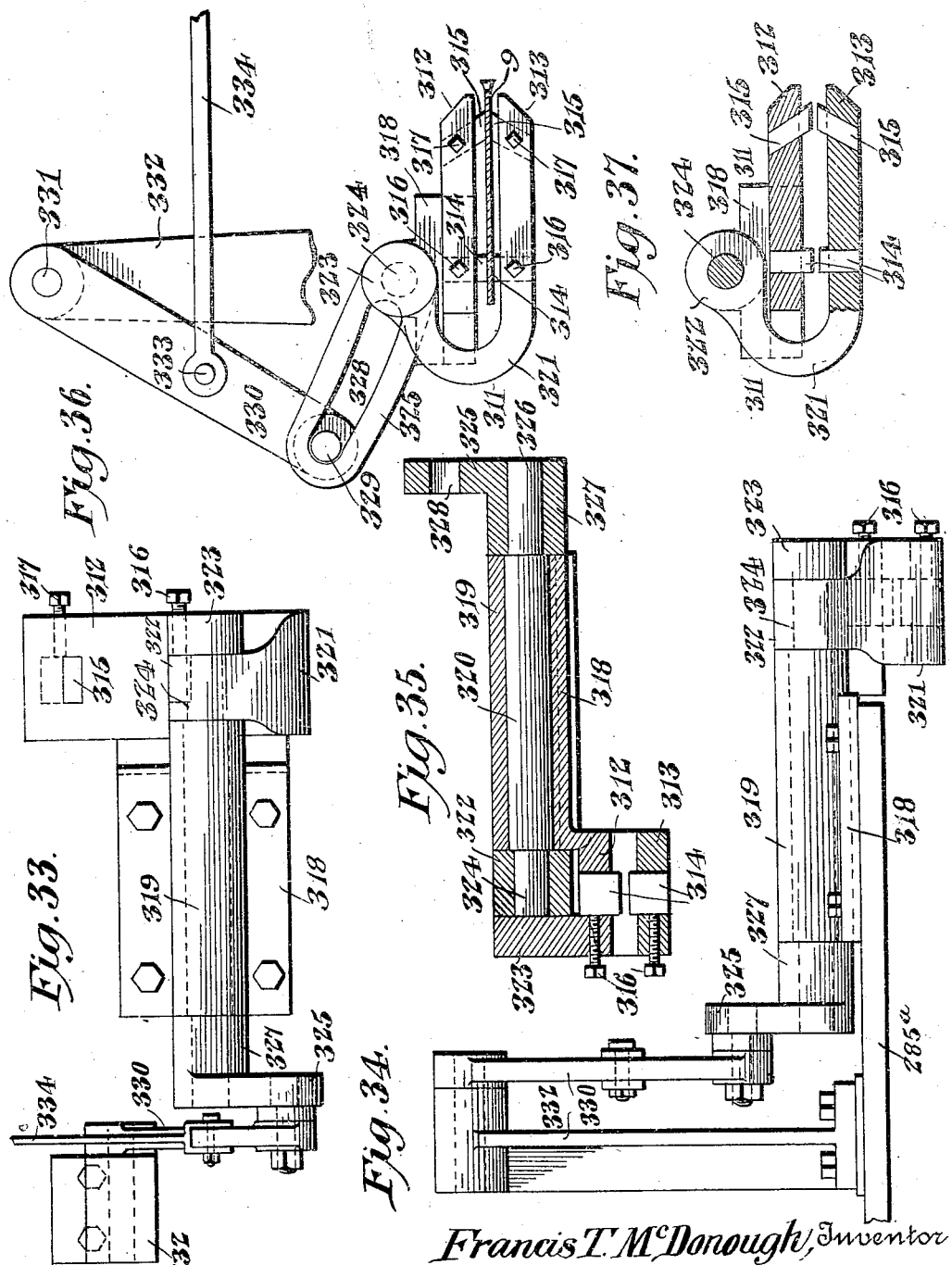

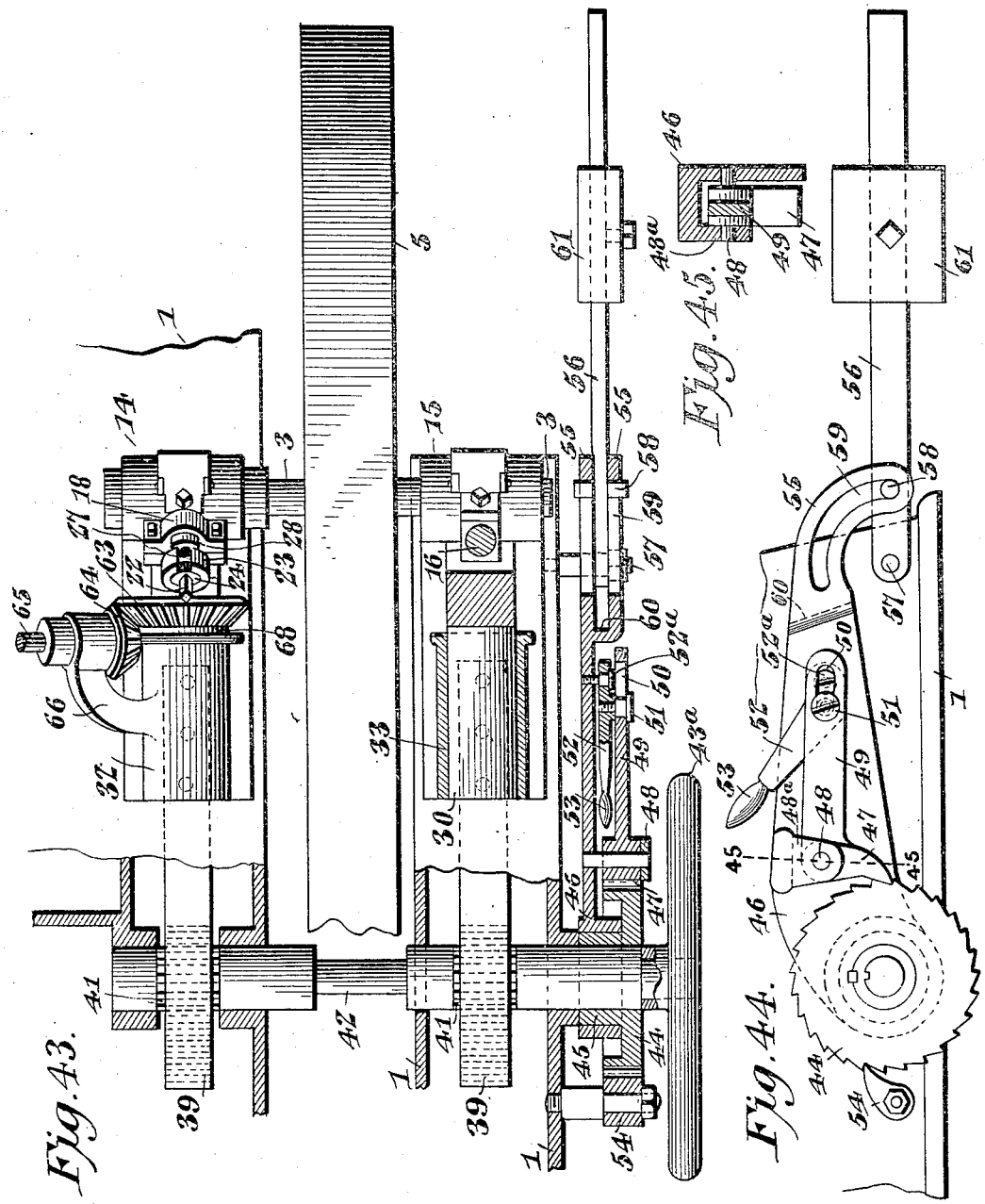

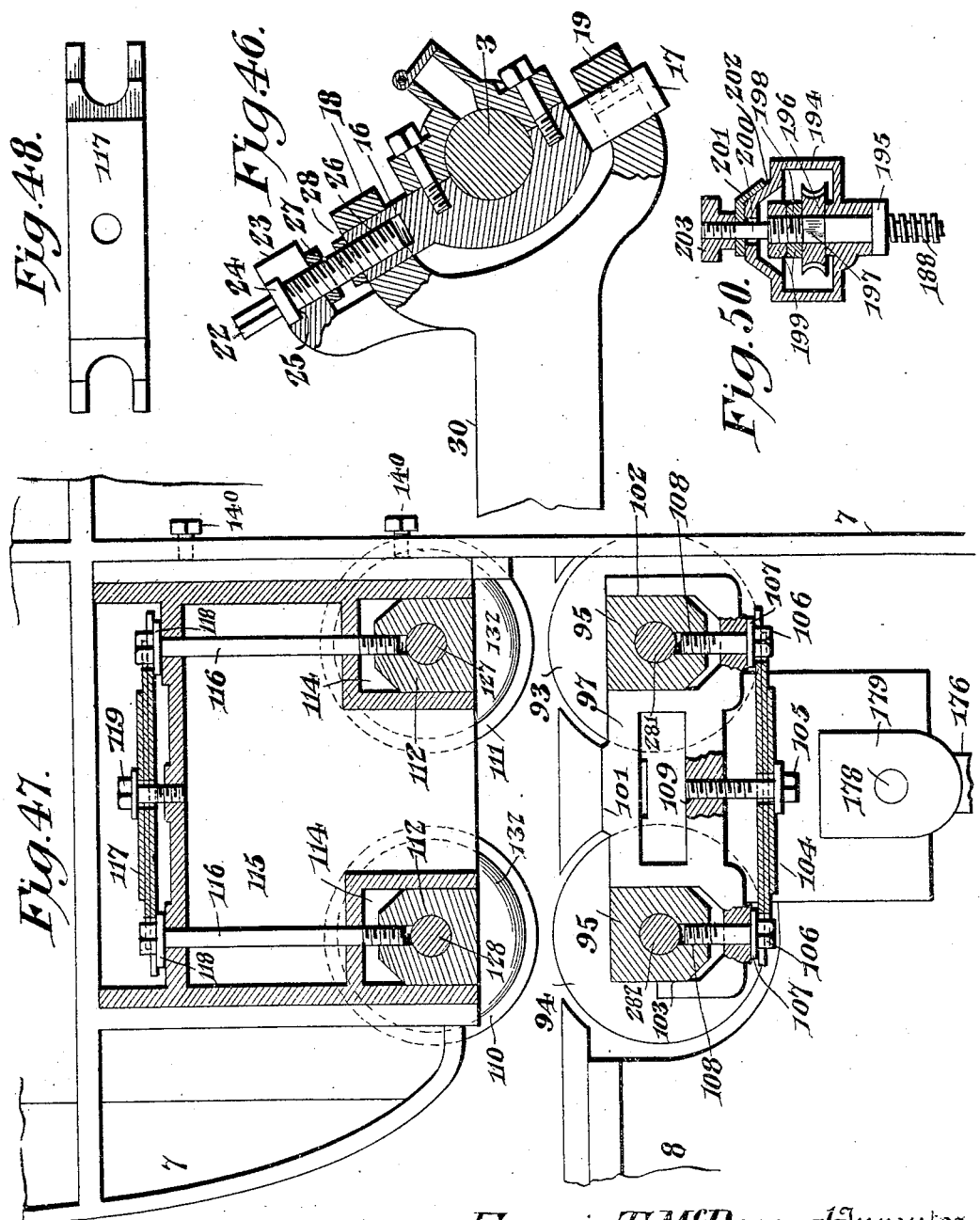

UNITED STATES PATENT OFFICE.

FRANCIS THOMAS McDONOUGH, OF EAU CLAIRE, WISCONSIN.

HORIZONTAL BAND RESAWING-MACHINE.

935,805.  Specification of Letters Patent.  Patented Oct. 5, 1909.

Application filed March 20, 1907. Serial No. 363,526.

*To all whom it may concern:*

Be it known that I, FRANCIS T. Mc-DONOUGH, a citizen of the United States, residing at Eau Claire, in the county of Eau Claire and State of Wisconsin, have invented a new and useful Horizontal Band Resawing-Machine, of which the following is a specification.

The invention relates to improvements in horizontal band resawing machines.

The object of the present invention is to improve the construction of horizontal band resawing machines, and to provide a highly efficient machine of this character, designed for resawing lumber and adapted for side or gage sawing, and capable also of center sawing, or equally dividing miscut or crooked lumber.

A further object of the invention is to provide a machine of this character, adapted, when sawing veneer, or when making other thin cuts, to saw such thin pieces from the top of the stock, whereby the band saw will be relieved of the weight of the bulk of the material to enable the band saw to run more freely and to prevent the same from binding.

A further object of the invention is to provide yieldable feed rolls, adapted to conform to the configuration of the stock, and capable of exerting a constant uniform pressure on the same and of enabling stock of different thicknesses to be simultaneously cut.

A further object of the invention is to provide feed rolls capable of yielding independently of the means for applying pressure to the stock, and adapted to be locked against such yielding action, so as to operate as rigid rolls, and coöperate with rigid bottom feed rolls, when the machine is arranged for center sawing.

A further object of the invention is to enable the upper feed rolls, which exert a constant pressure on the stock and which operate to positively feed the lumber to the saw, to also serve as a carrier or conveyer for returning the material from the back of the machine to the front thereof for the next cut.

When the machine is employed for sawing thin, or comparatively thin lumber, it is desirable that the saw line, or cutting edge of the effective portion of the band saw, be arranged between the adjacent feed rolls and near the plane of the vertical centers of the said rolls, and the present invention has for its object to enable the band saw to be thus arranged or variably adjusted, and to provide means for raising and lowering the feed rolls and for manually or automatically moving the same toward and from the saw to enable the said feed rolls to clear the band saw and the band saw wheels, and thereby permit the band saw wheels to be arranged close together to provide a compact machine, without interfering with the vertical movement or adjustment of the feed rolls.

The invention also has for its object to enable one of the band saw guides to be adjusted toward and from the other or tail band saw guide, and to provide means for enabling the operator, without leaving his position at the front of the machine, to open and close the tail guide to relieve the same, should a sliver, or the like, become wedged in the guide and clog, or otherwise interfere with the free running of the band saw.

Another object of the invention is to enable the adjustable band saw wheel, with which the tension device for stretching the band saw is connected, to be readily moved toward and from the other band saw wheel for accommodating band saws of different lengths, and also to enable the adjustable band saw wheel to be also moved in the arc of a circle, either to arrange its shaft in parallelism with the shaft of the heavy tail or drive wheel, or to set the adjustable band saw wheel at an angle for leading the band saw on the wheels.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 2:
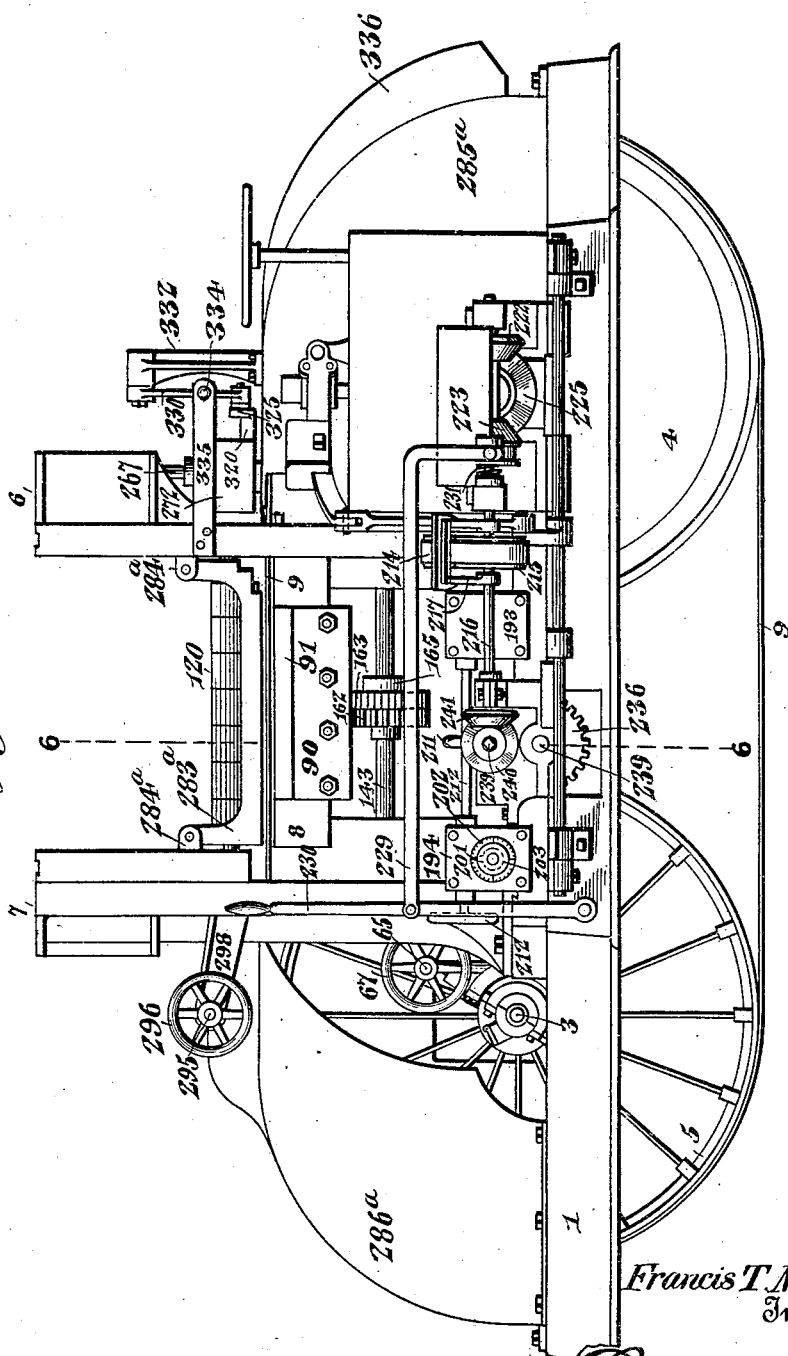
Figure 3:
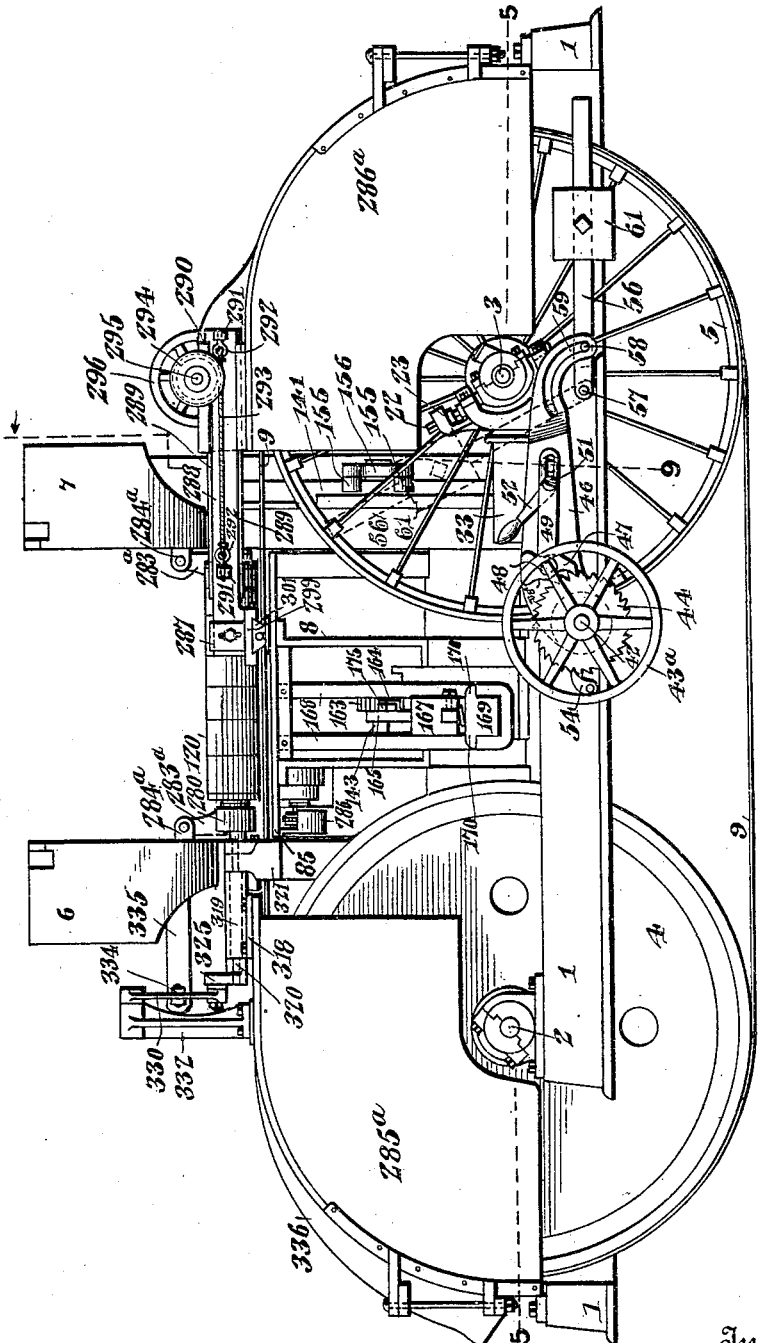
Figure 4:
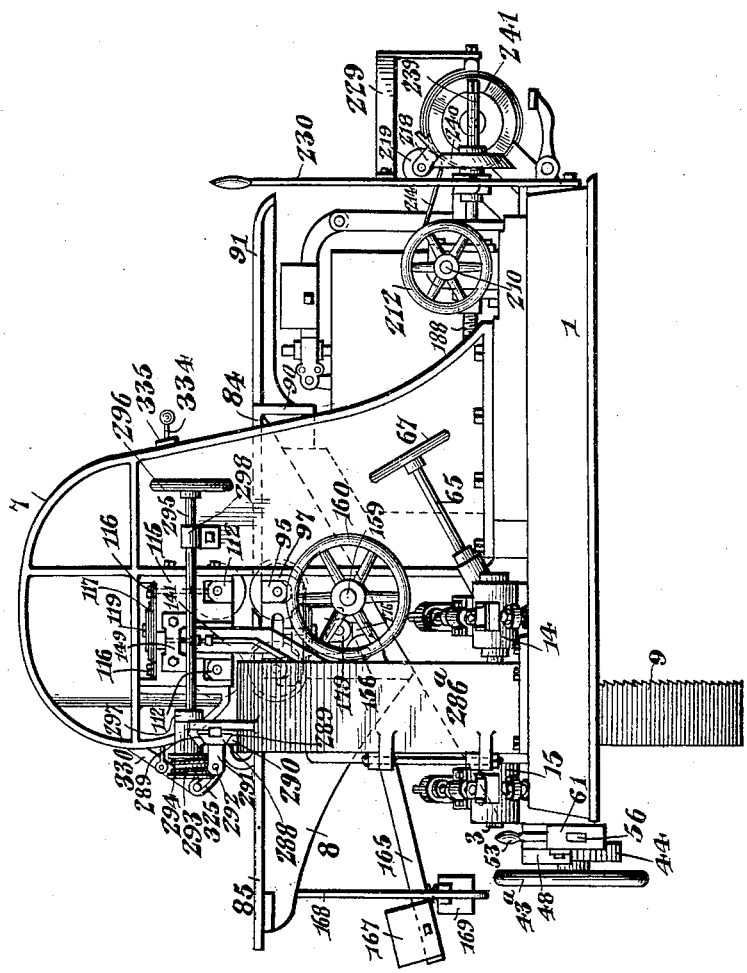
Figure 5:
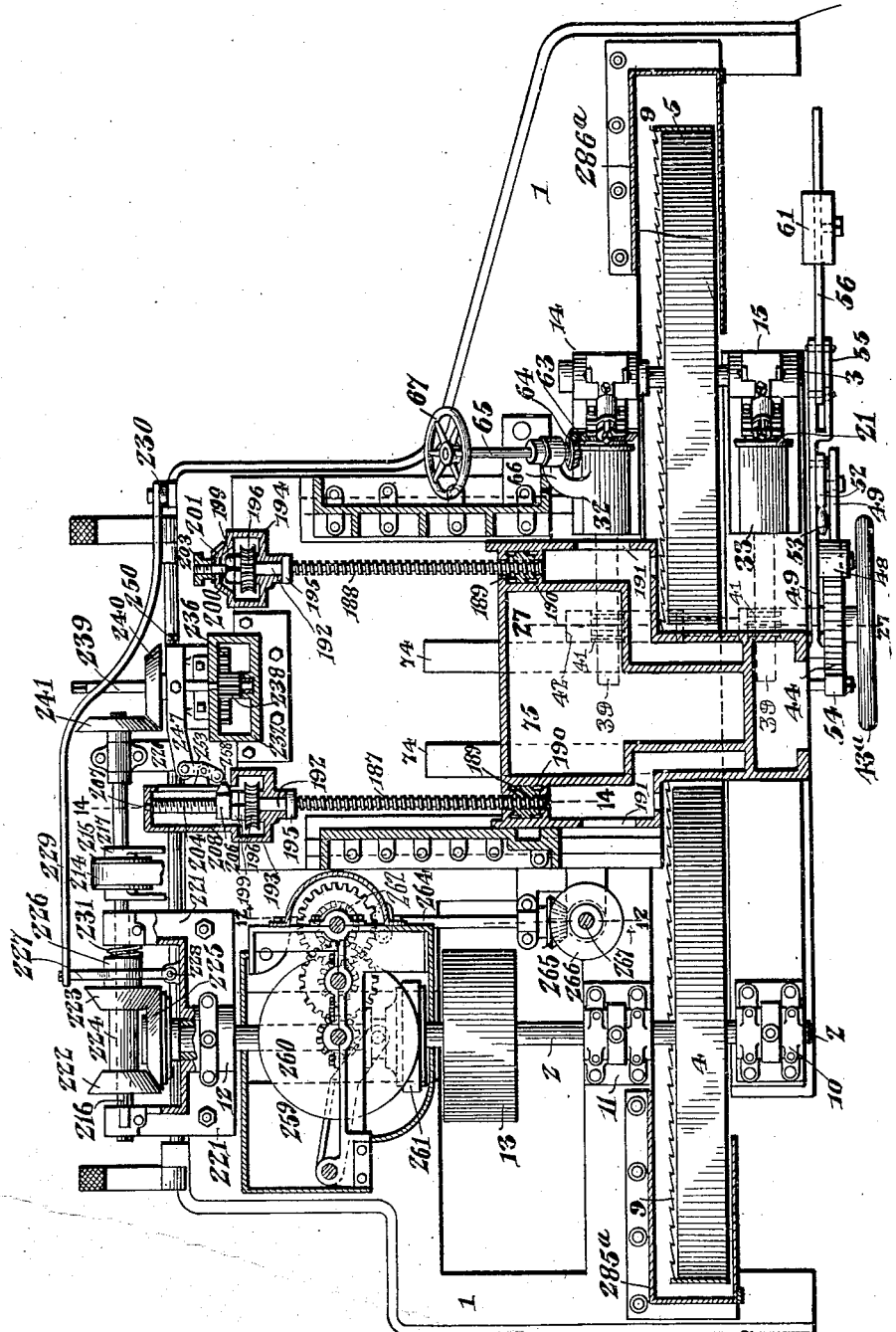
Figure 7:
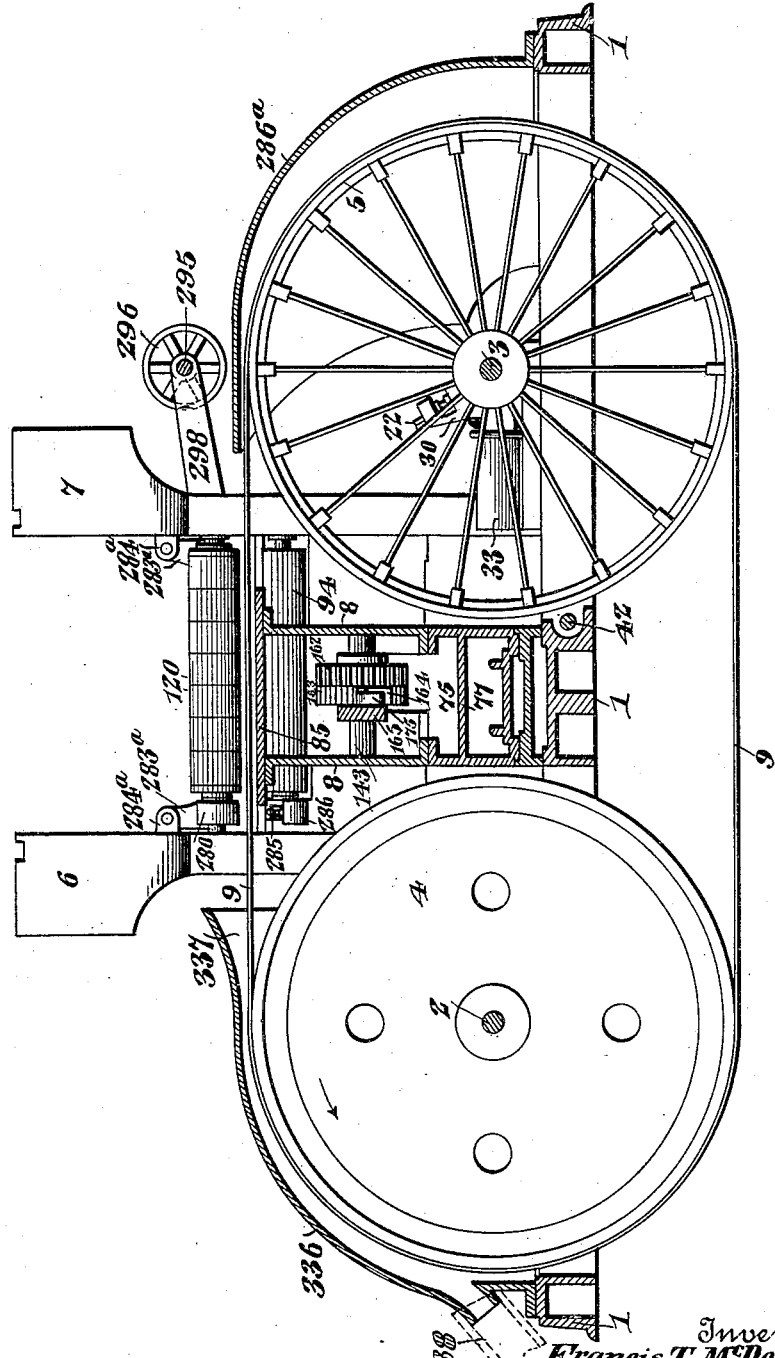

In the drawings:—Figure 1 is a plan view of a horizontal band resawing machine, constructed in accordance with this invention. Fig. 2 is a front elevation of the same. Fig. 3 is a rear elevation. Fig. 4 is an end elevation. Fig. 5 is a horizontal sectional view, taken substantially on the line 5—5 of Fig. 3. Fig. 6 is a vertical sectional view, taken substantially on the line 6—6 of Fig. 2. Fig. 7 is a vertical sectional view, taken substantially on the line 7—7 of Fig. 1. Fig. 8 is a vertical sectional view, taken substantially on the line 8—8 of Fig. 1. Fig. 9 is a vertical sectional view, taken substantially on the line 9—9 of Fig. 3. Fig. 10 is an enlarged sectional view, taken substantially on the line 10—10 of Fig. 8. Fig. 11 is a similar view, taken substantially on the line 11—11 of Fig. 8. Fig. 12 is an enlarged vertical sectional view, taken substantially on the line 12—12 of Fig. 5, and illustrating the arrangement of the gearing for rotating the feed rolls and the mechanism for vertically adjusting the said rolls. Fig. 13 is an enlarged detail horizontal sectional view, taken substantially on the line 13—13 of Fig. 12. Fig. 14 is an enlarged detail sectional view, taken substantially on the line 14—14 of Fig. 5. Fig. 15 is an enlarged detail sectional view, taken substantially on the line 15—15 of Fig. 1. Figs. 16 to 18 inclusive are detail views, illustrating the construction of the upper slidable frames, which carry the upper feed rolls. Figs. 19 to 21 inclusive are detail views, illustrating the construction of the slidable frames, which carry the lower feed rolls. Figs. 22 to 24 inclusive are detail views, illustrating the construction of the long slidable racks for raising and lowering the upper feed rolls. Figs. 25 and 26 are detail views, illustrating the construction of the short racks of the lower feed rolls. Fig. 27 is an enlarged detail sectional view, taken substantially on the line 27—27 of Fig. 5. Fig. 28 is an enlarged detail view, illustrating the construction for automatically operating the mechanism for moving the sub-base inwardly and outwardly. Fig. 29 is a sectional view, taken substantially on the line 29—29 of Fig. 28. Fig. 30 is an enlarged detail view partly in section, illustrating the construction of the vertically adjustable table and the means for guiding the same. Fig. 31 is an enlarged side view of a portion of the adjustable table. Fig. 32 is an enlarged detail sectional view, illustrating the manner of mounting the slidable frames of the lower feed rolls. Figs. 33—37 inclusive are detail views, illustrating the construction of the tail band saw guide and the means for opening and closing the same. Figs. 38 to 40 inclusive are detail sectional views of the band saw guide. Figs 41 and 42 are detail views, illustrating the construction of the upper feed rolls. Fig. 43 is an enlarged horizontal sectional view, partly in plan illustrating the construction of the tension device for stretching the band saw. Fig. 44 is an enlarged detail elevation of the same; the hand wheel being removed. Fig. 45 is a detail sectional view on the line 45—45 of Fig. 44. Fig. 46 is an enlarged detail sectional view, illustrating the manner of mounting the shaft of the adjustable band saw wheel. Fig. 47 is an enlarged detail view, partly in section, illustrating the manner of yieldably mounting the upper and lower feed rolls. Fig. 48 is a detail view of one of the leaf springs. Fig. 49 is a detail view of a portion of one of the upper feed rolls, showing the sections separated. Fig. 50 is a detail sectional view, illustrating the manner of mounting the adjusting screws for actuating the slidable frame or member, which raises and lowers the table.

Like numerals of reference designate corresponding parts in all the figures of the drawings.

1 designates a stationary base for the frame-work of the machine. The base, which is constructed of suitable metal, is designed to be placed on a suitable supporting surface, and it carries the bearings for the horizontal shafts 2 and 3 of a heavy tail or drive band saw wheel 4 and a light adjustable band saw wheel 5. The base is channeled or flanged, as shown, to secure the desired strength and stability with a minimum amount of metal, and it has horizontal upper and lower faces, as shown. The band saw wheels 4 and 5, which are located at opposite sides of the machine, are arranged in rear of a pair of vertical columns 6 and 7, bolted, or otherwise secured to a sub-base, hereinafter described, at opposite sides thereof, and constituting guides for a vertically adjustable table or lumber support 8, adapted to be raised and lowered to hold the lumber in proper position with relation to the band saw 9.

The shaft 2, which extends from the front to the back of the machine, is journaled in relatively fixed bearings 10, 11 and 12, and it has a driven pulley 13, mounted on it and designed to receive a belt for connecting the machine with the motor, or other power. The base 1 is provided with suitable openings for the band saw wheels and the pulley 13, which extends below the plane of the upper face of the base.

The adjustable band saw wheel 5, which is movable toward and from the tail band saw wheel 4 to accommodate the machine to band saws of different lengths and also to enable a tension device, hereinafter described, to stretch the band saw to the desired tension, is mounted in suitable bearings 14 and 15, which have upper and lower pivots or trunnions 16 and 17, set at an inclination and mounted in upper and lower bearings 18 and 19 of yokes 20 and 21. The inclined pivots or trunnions 18 and 19 to true the bearings 14 and 15, the adjustment being effected by means of upper screws 22. The adjusting screws 22, which are mounted in openings of the arms 23, are provided with collars 24, seated on shoulders 25 formed by counterboring the arms 23 at the upper faces thereof. The lower ends of the adjusting screws extend into interiorly threaded sockets or openings 26 of the upper pivots or trunnions 16 and engage the threads thereof, whereby, when the adjusting screws are turned, the bearings 14 and 15 will be raised and lowered. The bearings are securely held at the desired adjustment by lock nuts 27 and 28, arranged on the adjusting screws and engaging the lower faces of the arms 23 and the upper faces of the trunnions 16. The upper ends of the adjusting screws 22 are squared to receive a wrench, or other suitable tool for adjusting the bearings 14 and 15. The arms 23 are substantially L-shaped, and have their upper portions arranged in parallelism with the upper bearings 18 of the yokes.

The yokes, which are slidable horizontally, are provided with round stems 29 and 30, mounted in cylindrical openings 31 of slidable carriers 32 and 33, arranged in parallelism and saddling dove-tailed guides 34. The dove-tailed guides 34, which are preferably integral with the base 1, are provided with horizontal upper faces and have downwardly and inwardly inclined side edges. The slidable carriers are provided with dove-tailed grooves, formed by downwardly and inwardly inclined flanges 35, depending from the sides of the carriers, as clearly illustrated in Fig. 9 of the drawings. The slidable carriers are preferably provided with interiorly arranged wear plates 36, adapted to be adjusted by screws 37 to take up the wear and prevent any lateral vibratory movement of the carriers.

The dove-tailed guides 34 are provided with central longitudinal slots 38, in which are slidably mounted rack bars 39, secured by screws 40, or other suitable fastening devices to the lower faces of the slidable carriers at the median line thereof, and extending inwardly from the carriers, and meshing with gears 41 of a shaft 42. The inner portions of the rack bars are located beneath the top of the base and are provided at their lower edges with teeth 43. The toothed portions of the rack bars being interposed between the gears 41 of the shaft 42 and the top of the base, as clearly illustrated in Figs. 8 and 27 of the drawings. The gears 41, which are formed integral with the shaft 42, consist of teeth cut into the same. The base is provided with suitable bearings for the shaft 42, which is adapted to be rotated to slide the carriers inwardly and outwardly, and the outer or rear end of the shaft 42 is provided with a suitable hand wheel 43$^a$ to enable such operation to be performed by hand, when the shaft is relieved of the pressure of the weight, as hereinafter fully explained. The outer or rear end of the shaft 42 also carries a ratchet wheel 44, having an extended hub portion 45, projecting inwardly and receiving the inner end of a straining lever 46. The straining lever 46, which is provided with an eye or opening to fit the hub 45, carries a pawl or dog 47, mounted on a stud or pivot 48 and provided with an arm 49. The pivot 48 is supported at the outer end by a bearing or bracket 48$^a$, and the arm 49 is provided at its outer end with a slot 50. The slot 50 receives a headed stud or projection 51 of a short operating lever 52, angularly bent adjacent to one end and provided at the other end with a suitable grip or handle 53. The angularly bent end is fulcrumed on the straining lever 46 by means of a suitable pivot 52$^a$, consisting of a screw mounted in a threaded perforation of the straining lever, but a stud or pin may be mounted on the straining lever to form a pivot for the lever 52. The headed stud or projection 51 is located at the angle or bend, and it is arranged within the slot 50, whereby when the operating lever 52 is swung upward or downward, a corresponding movement will be imparted to the arm 49, and the pawl or dog 47 will be swung into or out of engagement with the ratchet wheel. When the operating lever 52 is swung upwardly and outwardly, the headed stud or projection 51 is carried to the outer end of the slot 50, and the lever will support the pawl or dog 47 out of engagement with the ratchet wheel 44. The ratchet wheel 44 is held against backward movement by a check or retaining pawl 54, when the pawl or dog 47 is out of engagement with it. The check pawl 54 is pivotally mounted on the base, and when the pawl or dog 47 of the straining lever is thrown out of engagement with the ratchet wheel 44, the shaft 42 may be turned by hand to move the adjustable band saw wheel 5 inwardly or outwardly.

The straining lever is provided with a curved outer bifurcated portion 55, composed of two sides spaced apart to receive a weight-carrying lever 56. The weight-carrying lever is pivoted at its inner end 57 on the base 1, and it is provided at an intermediate point with a transverse pin 58, projecting laterally from each side of the lever 56 and operating in arcuate slots 59 of the sides of the curved portion of the lever. The inner end wall 60 of the slot or bifurcation of the curved portion of the straining lever is inclined, and is adapted to form a stop for limiting the upward and inward movement of the weight-carrying lever. The weight-carrying lever, which is provided with an adjustable weight 61, is adapted to be swung upwardly from the position illustrated in full lines in Fig. 3 of the drawings, to that illustrated in dotted lines in said figure, to relieve the straining lever of weight, when it is desired to adjust the band saw wheel 5 by hand. The weight 61 is adjustably mounted on the lever 56, and is adapted to be moved toward and from the pivoted end 57 to apply the desired pressure on the band saw. The weight-carrying lever is adapted to be easily swung upwardly and downwardly, and it will be readily apparent that the weight may be directly applied to the straining lever, if desired.

The shank 29 of the front yoke 20 of the adjustable wheel 5 is adjustable independently of the rear yoke to aline the bearings for arranging the shafts 2 and 3 in parallelism, and also to set the adjustable band saw wheel at an angle for leading the band saw on the wheels 4 and 5. For this purpose, the shank 29 of the yoke 20 is provided at the outer portion with screw threads 62, which are engaged by a rotary nut 63. The rotary nut 63, which is in the form of a bevel gear, meshes with a bevel pinion 64 of an operating shaft 65, journaled in a suitable bearing of an arm 66 and provided at its outer end with a hand wheel 67. The arm 66 is preferably formed integral with the adjacent slidable carrier 32 and the shaft 65, which is arranged at an inclination, extends upwardly and forwardly. The gearing for adjusting the yoke 20 moves with the slidable carrier 32, and the rotary nut 63, which bears against the outer end of the latter, when rotated, moves the yoke 20 outwardly or inwardly. Only a comparatively small amount of adjustment of the yoke 20 is necessary to set the wheel 5 at the proper angle for leading the band saw on the band saw wheels, and for alining the shafts of the band saw wheels, when the band saw is in proper position.

If desired, cushions 68 of rubber, or other elastic material, may be arranged at the outer ends of the slidable carriers to cushion the yokes to relieve the band saw wheels and the band saw of jar and vibration. The parts of the tension device for straining the band saw, and the mechanism for moving the adjustable band saw wheel inwardly and outwardly, are readily accessible and easily removable for repair, when necessary.

The base, which affords a rigid support for the band saw wheels, is provided with guides consisting of ribs or rails 69, projecting from the upper face of the base and arranged at right angles to the plane of the band saw, and fitting in corresponding grooves or ways 70 of the sub-base 71, which is slidable toward and from the band saw to permit the feed rolls, hereinafter described, to clear the band saw wheels and the band saw. The grooves or ways of the sub-base are formed by depending webs or flanges, arranged in pairs and located at opposite sides of and fitting against the upper face of the base. Depending longitudinal transverse ribs or flanges 72 are also provided for supporting the sub-base at suitable points to provide a flanged structure to secure the requisite strength for the minimum amount of metal, and if desired, suitable anti-friction devices may be employed for reducing to a minimum the friction incident to the sliding movement of the sub-base. The sliding movement of the sub-base, which, as hereinafter fully explained, may be effected automatically through the adjustment of the table 8, can also be accomplished by hand.

By constructing the machine with a slidable sub-base, the band saw wheels may be brought close together and a comparatively short band saw may be used, for by moving the sub-base backwardly and forwardly, the rear upper feed roll, hereinafter described, may be adjusted without hitting the saw. This construction also renders the machine more compact and saves floor space. Furthermore, in sawing thin veneer from the top of the stock, the sub-base is drawn back sufficiently to prevent the rear upper roll from dropping upon the saw at the end of each cut.

The sub-base is provided on its upper face with guides or rails 73, which receive depending ribs 74 of a slidable wedge-shaped frame or member 75, composed of upwardly projecting sides 76 and a connecting bottom portion 77. The lower faces of the ribs 74 of the slidable wedge-shaped frame or member are horizontal, and the upwardly projecting sides are provided with inclined upper guiding faces 78, which receive and fit against inclined lower edges 79 of the table 8. The wedge, which is slidable between and guided by the columns 6 and 7, is adapted to raise and lower the table 8, which is also guided in its vertical movement by the said columns. The said columns 6 and 7 are provided at their inner faces with vertical ways 80 and 81, which receive laterally extending lugs 82 and 83 of the vertically adjustable table. The guide or way 80 of the standard 6 consists of a channel or groove, planed or otherwise formed in the inner face of the column 6. The other guide or way 81 consists of a groove, formed by vertical ribs or flanges, which project from the inner face of the column 7, as clearly illustrated in Fig. 30 of the drawings, but any other suitable means, however, may be employed for guiding the table in its vertical movement, and suitable anti-friction devices may be provided to reduce the friction to a minimum. The upper face of the table is arranged in a horizontal plane, and the parallelism thereof with the base is maintained throughout the entire adjustment of the table. The top of the table comprises sections 84 and 85, extending in advance and in rear of the saw and adjustably secured to the frame of the table by means of screws 86 and 87, or other suitable fastening devices, which enable the sections to be raised to compensate for the wear on the table. The screws 86, which are provided at their upper ends with heads, pierce the sections 84 and 85 at the top of the table and engage suitable threaded perforations of the frame of the table for securing the said sections 84 and 85 to the frame. The other screws 87 are mounted in threaded openings of the sections 84 and 85, and engage flanges or lugs 88 and enable the same to be raised to compensate for the wear on the table. By this arrangement of the screws, the sections 84 and 85 of the top of the table are securely fastened to the frame of the table, and are adjustable thereon. The band saw passes across the inner portion of the rear section 85 of the top of the table, and the section 84 is provided at its outer portion with a depending flange 89, to which is bolted, or otherwise secured, a corresponding flange 90 of a fixed extension or leaf 91, that is carried by the said section 84.

The sections 84 and 85 are spaced apart at the cutting edge of the band saw to provide a space for an intermediate section 92 and a pair of lower feed rolls 93 and 94, located in advance and in rear of the intermediate section, and journaled in suitable bearings 95 and 96 of lower slidable bearing frames 97, which are vertically movable on the table 8 at opposite sides thereof. The table 8 is provided at opposite sides with vertically disposed integral dove-tailed guides 98, having inwardly converging angularly disposed side edges and fitting in dove-tailed grooves 99 of the lower bearing frames 97, whereby the lower bearing frames are slidably interlocked with the sides of the table. The sides of the table are also provided with bearing recesses 100, arranged in advance and in rear of the guides 98 and receiving the journals of the lower feed rolls.

The lower slidable bearing frames or members are provided at their upper ends with projecting portions or seats 101, which receive the intermediate section 92, and the latter is secured by screws, or other suitable fastening devices to the lower slidable members and forms a rigid connection for the same. The section 92 may also be adjustably mounted in the same manner as the sections 84 and 85, heretofore described. The bearings or journal boxes 95 and 96 are slidable in vertical recesses 102 and 103 of the lower bearing frames 97, and they are yieldably supported by lower leaf springs 104. The lower leaf springs 104, which are located beneath the lower bearing frames 97, are adjustably connected at their centers with the same by means of adjusting screws 105, and they are connected at their terminals with the journal boxes or bearings 95 and 96 by adjusting screws 106. The adjusting screws 106 are provided at the inner or upper faces of their heads with collars 107, which are engaged by the leaf springs, the ends of the latter being slotted or bifurcated to straddle the heads of the screws 106. The lower bearing frames are provided with openings for the passage of the screws 106, which engage threaded sockets 108 of the lower ends of the journal boxes 95 and 96. The central adjusting screw 105 is also provided at the inner or upper face of its head with a collar for engaging the lower face of the leaf spring, which is provided with a central opening for the passage of the screw, and the latter engages a threaded opening 109 of the lower bearing frame.

The lower feed rolls are yieldably supported by the lower leaf springs and are capable of vertical adjustment, and are also adapted to be rigidly supported by lowering the journal boxes 95 and 96 to the bottoms of the vertical recesses 102 and 103. The downward movement of the lower bearing frames is limited by inwardly extending lugs 97$^a$, which are received within recesses 98$^a$, located at the tops of the vertical dove-tailed guides 98. The lugs 97$^a$, which extend horizontally from the inner faces of the lower bearing frames 97, are provided with threaded shanks, which engage threaded openings of the lower bearing frames.

The upper feed rolls 110 and 111 are journaled in suitable bearings or journal boxes 112 and 113, which are vertically slidable in recesses 114 of upper vertically movable bearing frames 115. The journal boxes 112 and 113 are connected by adjusting screws 116 with upper leaf springs 117, located at the tops of the upper bearing frames 115 and constructed similar to those heretofore described. The screws 116 are also provided with heads, having collars 118 at their inner or lower faces for engaging the slotted or bifurcated ends of the leaf springs, which straddle the heads of the screws 116. Each upper leaf spring is adjustably connected at its center with the upper bearing frame 110 by means of a screw 119, provided with a head having a collar for engaging the upper face of the leaf spring. The upper leaf springs yieldably hold the upper feed rolls in engagement with the stock, and the tension of the springs 117, and the consequent pressure of the upper feed rolls on the material may be controlled by the central screws 119. The end screws 116 enable the upper feed rolls to be adjusted vertically, and they are also adapted to raise the journal boxes 112 and 113 to the upper ends of the recesses 114 for mounting the upper journal boxes or bearings solidly on the upper bearing frames.

The lower feed rolls may be constructed of any suitable material, and in practice are designed to extend so slight a distance above the upper face of the table as not to cause any material rise of the lumber passing over them in the passage of the same to the saw. The upper feed rolls are provided with independently movable yieldably mounted rim sections 120, which are arranged on spider hubs 121, having radial arms 122, extending into inner recesses 123 of the rim sections 120. The recesses 123 are of sufficient size to permit a limited rotary and a limited radial movement of the rim sections, independently of the inner spider-shaped hubs or sections 121. The outer or rim sections are maintained concentric with the inner or hub sections by yieldable means, which may be either in the form of springs, or elastic rings 124 of rubber, but any other suitable material may be employed. The hub sections are provided at their side faces with registering annular recesses 125, which receive the elastic rings 124, and the latter are of a size to fill the said recesses, and they project beyond the outer ends of the arms of the hub sections and fit in annular recesses 126 of the rim sections. The annular recesses 126 of the rim sections are located at the inner peripheries of the said rim sections, and they register with each other similar to the annular recesses of the hub sections. The hub and rim sections of the upper feed rolls are laterally movable on the shafts 127 and 128, and the rim sections are adapted to interlock, as clearly illustrated in Fig. 11 of the drawings, to form rigid upper feed rolls. The hub sections 121 are splined, or otherwise slidably interlocked with the shafts 127 and 128. For this purpose, the rim sections are provided with interlocking V-shaped grooves 129 and ribs 130, which interfit and which lock the rim sections against relative movement. The rim sections are held in this interlocked relation by means of a relatively fixed nut 131 and an adjustable nut 132, located at the ends of the feed roll and provided respectively with a V-shaped rib and a corresponding groove. The oppositely tapered or V-shaped rib of the nut 131 fits in the groove of the contiguous terminal rim section 120, and the groove of the nut 132 receives the oppositely beveled rib of the other end section 120. The nut 131 engages a threaded portion 133 of the shaft on which the feed roll is mounted, and the other nut 132 consists of a cylindrical body portion, having inwardly and outwardly extending annular flanges. The outwardly extending annular flange is provided with a V-shaped groove, and the inwardly extending flange is threaded and engages exterior threads of an adjusting nut 134, which is also interiorly threaded to engage a threaded portion 135 of the shaft. The nuts 133 and 134 are adapted to be moved outwardly to release the sections of the upper feed roll, and the lateral separation of the sections of the upper feed roll is effected by means of coiled springs 136, which are mounted in registering sockets of the hub sections. The coiled springs, which are interposed between the hub sections, are compressed, when the hub sections are interlocked, as shown in Fig. 11, and they are adapted to expand and carry the rim sections out of engagement with each other. The elastic rings may also be laterally compressed, when the rim sections are interlocked, so that they will expand and assist in moving the sections out of engagement with each other. When the machine is arranged for center sawing, as hereinafter explained, the rim sections of the upper feed rolls are interlocked to present unyielding surfaces to the lumber, but when the machine is employed for gage sawing, the sections are released and are permitted to adjust themselves to the uneven surfaces of the lumber, and separate pieces of lumber of different thicknesses may be simultaneously sawed by reason of the yielding action of the upper feed rolls.

The columns 6 and 7 have enlarged top portions, which are bowed laterally from each other to provide inner recesses 137 in which the upper vertically movable bearing frames of the upper feed rolls operate, and the columns have vertical guides or ways 138 at the front and rear walls of the recesses 137 to receive vertical ribs or flanges 139 of the upper slidable bearing frames 115. The guides or ways 138 preferably consist of grooves, and the upper bearing frames slide in the guides or ways and are actuated by a tension device, hereinafter described, for applying the desired pressure to the lumber for feeding the same to the band saw, and the said upper frames are adapted to be held rigid with the columns, to permit an independent adjustment of the table and the lower feed rolls, set screws 140 being provided for clamping the upper bearing frames. The set screws 140, which may be of any desired number, are mounted in threaded openings of the front portions of the enlarged tops of the columns at the grooves or ways thereof in position for engaging the bearing frames.

The tension device for applying pressure to the lumber through the upper rolls comprises a pair of vertically movable rack bars 141, located at opposite sides of the machine and connected at their upper ends with the upper bearing frames of the upper feed rolls and provided with teeth, which mesh with gears 142 of a shaft 143, journaled in suitable bearings of the vertically movable table at opposite sides thereof and carried by the said table in the movements thereof. Each rack bar 141, which extends from the upper feed rolls to the lower portion of the machine, consists of upper and lower vertical portions and an inclined connecting portion, which off-sets the lower toothed portion of the rack bar from the vertical plane of the upper portion thereof. Each of the bearing frames is provided with laterally projecting substantially L-shaped ribs or flanges 144, forming a substantially T-shaped recess 145, in which the upper portion of the rack bar is fitted. The body portion of the rack bar is flanged, but the upper end portion 146 is flat to fit within the vertical recess 145 and engage the outer portion of the flanges 144. The rack bar is adjustably connected with the upper bearing frame by means of an adjusting screw 147, having upper and lower right and left hand threaded portions, and provided with a central polygonal wrench-receiving portion. The upper portion of the adjusting screw engages a threaded opening 148 of a horizontal plate or member 149, which extends across the recess 145 and which is secured to the upper portions of the ribs or flanges 144 by screws 150, or other suitable fastening devices. The plate or member 149 is provided with an inwardly projecting portion 151, having parallel side faces and fitting between the flanges 144 at the outer portions thereof. The lower portion of the adjusting screw 147 engages a threaded socket 152 of the rack bar 141. The rack bar is provided at the lower end of the flat portion 146 with a lug or enlargement 153, and the web or flange 154 extends downward from the lug or enlargement 153. The threaded socket 152 extends downward from the upper face of the lug or enlargement 153, being partially formed in the flange or web 154. The adjusting screws 147 are adapted to be operated to position the teeth of the rack properly with relation to the gears 142 of the shaft 143.

The face of the lower portion of the rack bar, which is provided with teeth, is arranged in a plane at right angles to the plane of the side faces of the upper flat portion 146, and the gears 142 are formed by cutting teeth in the end portions of the shaft 143. The lower toothed portion of the rack bar is approximately L-shaped in horizontal section, and the teeth are held in mesh with the shaft by means of anti-friction devices preferably consisting of anti-friction rollers or wheels 155, mounted in brackets 156. The brackets 156 consist of plates, having bearing openings 157 to receive the ends of the shaft 143 and provided with upwardly and downwardly projecting arms to which the anti-friction rollers or wheels are secured by screws 158, or other suitable fastening devices. The anti-friction rollers or wheels fit in the angle of the toothed portions of the rack bars, and the shaft 143 is adapted to rotate freely in the openings 157 of the bearing brackets. The bearing brackets 156 may be retained on the ends of the shaft 143 by any suitable means.

When the shaft 143 is rotated, the rack bars are raised and lowered, and this operation may be performed by hand to position the upper feed rolls properly with relation to the table. The manual adjustment of the feed rolls is effected through a shaft 159, journaled in suitable bearings of the sides of the table, and having one end extended and provided with a hand wheel 160. The shaft 159, which is arranged in parallelism with the shaft 143, carries a pinion 161, which meshes with a gear wheel 162, keyed or otherwise secured to the shaft 143. The shaft 143 also carries a ratchet wheel 163, arranged contiguous to the gear wheel 162 and engaged by a pawl or dog 164 of a weighted lever 165. The ratchet wheel is keyed, or otherwise secured to the shaft 143, and the weighted lever is provided at its inner end 166 with an opening to receive the shaft 143, on which the weighted lever 165 is fulcrumed. The lever 165 is provided at its outer end with a weight 167, which is adjustable longitudinally of the lever to produce the desired pressure on the lumber. The outer portion of the lever extends between the sides of a substantially U-shaped hanger 168, depending from the table and having the transverse connecting portion, which supports a metallic block or piece 169, on which the lever is adapted to rest, when at the limit of its downward movement. The block or piece, which is provided at its top with spaced lugs 170 to straddle the sides of the hanger 168, has a socket 171, in which is seated a coiled spring 172 for cushioning the weighted lever. The hanger and the block are adapted to support the weighted lever to relieve the shaft 143 of the same, when it is desired to adjust the feed rolls independently of the weighted lever. The pawl or dog 164 is mounted on a pivot 173, which pierces the lever 165 adjacent to the ratchet wheel, and a suitable handle 174 is connected with the pivot for operating the pawl or dog to throw the same into and out of engagement with the ratchet wheel. The pawl or dog is maintained normally in engagement with the ratchet wheel by a spring 175, secured at one end to the lever and having its other end engaging the pawl or dog 164 at the outer edge thereof. When the pawl or dog 164 is disengaged from the ratchet wheel, the upper feed rolls may be easily raised and lowered by the turning of the hand wheel 160.

When the machine is arranged for center sawing, or for sawing a piece of lumber exactly in half, the lower feed rolls are connected with the shaft 143 by means of a pair of short rack bars 176, which mesh with the gears 142 at the side of the shaft 143 opposite that at which the long rack bars 141 are arranged. The short rack bars, which are provided at their upper ends with ears 177, are pivoted to the lower vertically movable bearing frames 97 at the lower ends thereof by pins 178. The lower bearing frames are provided at the lower portions with exteriorly arranged substantially L-shaped arms 179, which support the outer ends of the pivot pins 178, as clearly illustrated in Fig. 32 of the drawings. The short rack bars are moved into and out of mesh with the gears 142 of the shaft 143 by eccentrics 180, mounted on shafts 181 and operating in collars or sleeves 182 of links 183. The shafts 181, which are arranged horizontally, are journaled in suitable bearings of the sides of the table and are provided at their outer ends with suitable operating handles 184. The cams or eccentrics 180 are circular, and are provided with eccentrically arranged openings to receive the shafts 181, and they are adapted to be rotated by the latter for moving the links 183 inwardly and outwardly to carry the short rack bars into and out of mesh with the gears 142. The short rack bars 176 are provided with recesses 185 to receive the links 183, which are pivoted to the short rack bars by pins 186, but the links, which form sleeves or straps for the eccentrics, may be connected with the rack bars 176 in any other desired manner. The rack bars and the pinions or gears will produce a uniform vertical movement of the upper and lower feed rolls for center sawing, and when it is desired to arrange the machine for center sawing, the weighted lever is lowered to the bottom of the hanger 168, and the pawl or dog is disengaged from the ratchet wheel to permit the upper rolls to be adjusted by hand, through the shaft 159. The upper feed rolls are then raised the desired distance above the saw line, say three inches, and are temporarily locked in such position by the screws 140. The table is then operated, by the means hereinafter described, to drop the lower feed rolls a distance of one inch below the saw line. The short racks are then moved into mesh with the gears or pinions of the shafts 143, and the upper feed rolls are unlocked. The upper and lower feed rolls are then moved by the wedge until they are equal distances from the saw line, and they will then be moved uniform distances by the tension device, when the pawl or dog is reëngaged with the ratchet wheel, so that any inequalities in the stock will not interfere with the accurate cutting of the same through the center thereof.

In practice, the machine will be equipped with a suitable gage for enabling the adjustments of the upper and lower feed rolls to be accurately made. It will be seen that as the table and lower feed rolls are one inch below the saw line and the upper feed rolls are three inches above the saw line, by dropping the table one inch, the upper and lower feed rolls, which move downward with the table, will be arranged equal distances from the saw line, as the upper rolls will also be carried downward with the table in such movement. The weighted lever, which is reëngaged through its pawl or dog with the ratchet wheel, is adapted to produce a pressure on the lumber through both the upper and lower feed rolls, and any rotary movement of the shaft 143 will move the upper and lower feed rolls in opposite directions uniform distances, so that a crooked piece of lumber will be equally divided. When the machine is arranged for center sawing, the weight of the upper feed rolls operates to counter-balance the weight of the lower feed rolls, which are otherwise difficult to raise, and the weight of the lumber resting upon the lower feed rolls is counter-balanced by the weight on the lever of the tension device. Also by mounting the tension device and the mechanism for adjusting the feed rolls below the top of the table, the space above the top feed rolls is left clear for returning the material to the front of the machine for resawing the lumber.

The slidable wedge-shaped frame or member 75 is actuated to raise and lower the table by means of horizontal adjusting screws 187 and 188, which are mounted on the sub-base for rotary movement and which engage nuts 189, carried by the slidable wedge-shaped frame or member 75. The nuts 189, which are preferably constructed of brass, but which may be made of any suitable metal, are located within recesses 190 of the wedge-shaped member, and fit against the front and rear walls thereof. The sockets or nut-receiving chambers 190 are located at opposite sides of the wedge-shaped frame or member 75 at the front thereof and adjacent to the bottom of the same. The sockets or nut-receiving chambers 190 are preferably open at the top to enable the nuts to be conveniently placed therein, and the wedge-shaped frame or member 75 is provided at opposite sides with openings 191 to afford access to the nut-receiving chambers or sockets. The nuts have polygonal portions, which fit against the side walls of the chambers or sockets for holding them against rotary movement, and the wedge-shaped frame or member is provided at opposite sides with openings, extending through the front and rear walls of the sockets, or nut-receiving chambers 190 and through the rear walls of the side portions to permit the adjusting screws to pass entirely through the side portions of the wedge-shaped frame or member 75, in the adjustment thereof.

The adjusting screws are provided with smooth, rounded outer portions, or journals 192, which are arranged in bearings 193 and 194, suitable collars 195 being provided at the inner terminals of the smooth, rounded portions 192 to fit against the bearings 193 and 194, which are in the form of casings to receive worm gears 196. The smooth portions 192 are squared at 197 to receive the worm gears, and they are threaded at 198 adjacent to the squared portions to receive nuts 199 for retaining the worm gears on the squared portions 197 of the adjusting screws. The adjusting screw 188 is provided beyond the nut with a smooth reduced portion 200, which extends through the outer wall of the casing 194 and which receives an exterior indicating hand or pointer 201, arranged to move over the graduations of a scale 202. The end of the outer or front portion of the adjusting screw is threaded for the reception of a nut 203, which retains the indicating hand or pointer in place. The scale, which may be marked off on a suitable dial, indicates the degree of adjustment of the wedge-shaped frame or member and the consequent vertical movement of the table, and the worm gearing and the adjusting screws afford a fine accurate and positive adjustment, and enable the machine to produce a fine quality of work of uniform thickness, and they maintain the table rigidly in its adjusted position. The other adjusting screw 187 is provided with a threaded extension 204, receiving a slidable nut 206, and provided at its outer end with a reduced journal or gudgeon 207, which is arranged in the bearing opening at the outer end of a combined guide and casing 208.

The worm gears 196 mesh with worms 209 of a transverse shaft 210, which is mounted in bearing openings of the casings or bearings 193 and 194. The shaft, which is also supported by a central bearing 211, is provided at one end with a hand wheel 212 and has a pulley 213, keyed or otherwise secured to its other end and receiving a belt 214. The wheel 212 enables the slidable wedge-shaped frame or member 75 to be adjusted by hand. The slidable wedge-shaped frame or member is also adapted to be operated by the power, which operates the machine and the belt 214 is also arranged on a pulley 215 of a shaft 216, arranged horizontally and disposed transversely at the front of the machine at the bottom thereof. The belt 214 is maintained at the proper tension by a pivotally mounted belt tightener 217, consisting of an inclined frame, composed of two sides spaced apart at the lower portion to straddle the pulley 215 and the upper stretch of the belt, and connected at the top portion and provided thereat with projecting arms 218, between which is mounted an idler 219. The idler rests upon the upper stretch of the belt and the weight of the belt tightener frame is sufficient to maintain the belt at the desired tension to secure the proper frictional engagement between the belt and the pulleys 213 and 215. The pulley 213 is carried by the sub-base in its sliding movement, while the pulley 215 is mounted on the base of the machine, and the belt tightener takes up the slack of the belt incident to the outward movement of the sub-base, and it permits the belt to accommodate itself to the inward movement of the sub-base.

The horizontal shaft 216 is journaled in suitable bearings of an arm 220 and a substantially U-shaped bearing bracket or frame 221, and it receives slidable friction gears 222 and 223, which are connected by an integral sleeve 224, located at opposite sides of a continuously rotating friction gear 225 carried by the shaft 2. Either of the friction gears 222 and 223 is adapted to frictionally engage the continuously rotating friction gear 225, or both of the friction gears 222 and 223 may be held out of engagement with the gear 225. By this arrangement the horizontal shaft 216 may be rotated in either direction, or stopped as desired. The sleeve 224, which rotates with the horizontal shaft 216 is slidably connected with the same by a feather or spline, and the friction gear 223 has a hub extension 226, which is provided with an annular groove for the reception of a shifting lever 227. The shifting lever 227, which is fulcrumed at its inner end 228 on the bearing frame or bracket 221, has its outer end connected by a rod or bar 229 with an operating lever 230, located at the front of the machine adjacent to one corner thereof within easy reach of the operator, and adapted to be oscillated to adjust the wedge-shaped frame or member 75. The bearing bracket or frame 221 consists of a pair of projecting arms and a connecting portion, bolted or otherwise secured to the base of the machine and provided near its center with the bearing 12 for the front end of the shaft 2. Any suitable means may be provided for securing the operating lever in its adjustment, and a coiled spring 231 is interposed between the inner arm of the bearing frame or bracket 221 and the hub extension of the friction gear 223, for moving the friction gears 222 and 223 in one direction.

The sub-base is provided between the bearings 193 and 194 with a casing or housing 232, having a depending arm 233 for supporting a nut 234. The nut 234 receives the outer portion of an adjusting screw 235, which is provided with inner and outer right and left hand threaded portions and which has a central polygonal portion for the reception of a gear 236. The inner threaded portion of the screw engages an inner nut 237, which is mounted on the base of the machine. The gear 236 meshes with a pinion 238 of a shaft 239, which, when rotated, operates the screw to move the sub-base inwardly or outwardly according to the direction in which the screw is rotated. The outer end of the shaft 239 is squared to receive a crank handle, or other suitable means for manually operating the gearing for sliding the sub-base. The shaft 239 also carries a friction gear 240, which is adapted to engage a friction gear 241 of the shaft 216. The shaft 239 is capable of a limited lateral movement to carry the friction gear 240 into and out of engagement with the friction gear 241, and it is normally held out of engagement by a pair of coiled springs 242 and 243, which are disposed horizontally, or interposed between a support 244 and a pair of lugs 245 and 246 of a shiftable member 247.

The support 244 is in the form of a bracket, and is provided at opposite sides with recesses or sockets to receive the springs, and it has a central recess 248, which receives a depending ear 249 of the shiftable member 247. The shaft 239 passes through the ear 249, which is located equidistant of the lugs 245 and 246, and the latter depend from the shiftable member 247 and are normally spaced from the bracket or support 244. The outer lug 246 is provided with a threaded opening for the reception of an adjusting screw 250, which carries a disk or washer 251 at its inner end for engaging the outer end of the adjacent spring for regulating the tension of the springs 242 and 243. The inner end 252 of the shiftable member 247 is pivoted to one arm of a lever 253, which is fulcrumed by a suitable pivot 254 on an ear 255 of the combined guide and casing 208. The combined guide and casing is provided at one side with a longitudinal slot 256, which forms a guide for a lug or projection 257 of the slidable nut 206. The lug or projection 257 is oppositely beveled, and it is adapted to hold the nut against rotary movement within the combined guide and casing, whereby when the screw 187 is rotated, the nut 206 will be moved longitudinally of the combined guide and casing 208. The lever 253, which has a slight angular or bell crank form, has its free end 258 arranged in the path of the lug or projection 257, whereby when the sliding nut is actuated by the adjusting screw 187, it will automatically oscillate the lever and hold the friction gear 240 in engagement with the friction gear 241, a sufficient length of time to move the slidable base outward the limit of its movement, which, in practice, will be about two inches. This automatic operation of the sub-base is effected when the table is lowered any considerable distance, which movement would otherwise cause the upper feed roll 110 to come into contact with the band saw wheels. It is desirable to arrange the saw line or cutting edge of the saw close to the vertical plane of the shafts of the upper and lower rear feed rolls, as illustrated in Fig. 6 of the drawings. This brings the band saw wheels in the path of the rear feed roll, when the machine is compactly arranged, and the band saw wheels are as close to each other as shown in Figs. 2, 3 and 7 of the drawings. In order to prevent the rear feed rolls from coming in contact with the band saw and the band saw wheels, the sub-base is automatically moved outward by the slidable nut and the shifting mechanism, which is operated by the nut. The lug 257 has a straight outer end edge or face, which is of sufficient length to maintain the friction wheels 240 and 241 in engagement with each other, long enough to cause a complete operation or movement of the sub-base. When the table is raised, the slidable nut will be moved inwardly and will operate the lever 253 and move the sub-base to the limit of its inward movement.

Motion is communicated to the feed rolls from the shaft 2 by means of variable speed mechanism 259, forming the subject-matter of a companion application and embodying a horizontal friction gear 260 and a vertical friction gear 261, slidably mounted on the shaft 2 and movable across the horizontal friction gear 260, whereby the horizontal friction gear may be driven at different speeds.

As the variable speed mechanism constitutes a separate and distinct invention from that claimed in the present application, a detailed description and a complete illustration thereof are deemed unnecessary. The variable speed mechanism is connected by bevel gears 262 and 263 with a horizontal shaft 264, and the latter is connected by bevel gears 265 and 266 with a vertical shaft 267, located adjacent to the column 6 and slidably receiving bevel pinions 268 and 269. The bevel gears 268 and 269, which are disposed horizontally, communicate motion respectively to the upper and lower feed rolls, and are connected with the vertical shaft 267 by means of suitable keys 270 and a key-way 271, whereby the bevel pinions are slidably interlocked with the vertical shaft. The vertical shaft is preferably provided with a longitudinal groove to form the way 271, and the keys 270 are preferably carried by the bevel pinions, but any other suitable means may be employed for slidably interlocking the same with the vertical shaft 267. The horizontal bevel gears 268 and 269, which are arranged within the casings 272 and 273, mesh with vertical bevel gears 274 and 275 of the front upper and lower feed rolls.

The upper and lower casings, which protect the bevel gearing from the dust, are connected with and carried by the journal boxes or bearings 96 and 113. The vertical bevel pinion 274 is keyed, or otherwise secured to the shaft 127, and the shafts 127 and 128 of the upper feed rolls are connected by sprocket gearing, consisting of a sprocket chain 276 and sprocket wheels 278 and 279, mounted respectively on the shafts 127 and 128. The sprocket gearing, which is housed within a suitable casing 280, causes the upper feed rolls to rotate in unison and in the same direction for feeding the lumber to the band saw. The casing 280, which may be of any desired construction, is located between the upper feed rolls and the column 6, and it is provided with suitable bearings for the shafts 127 and 128 and is supported by the same. Shafts 281 and 282 of the lower feed rolls 93 and 94 are connected by sprocket gearing, consisting of a sprocket chain 283 and sprocket wheels 284 and 285. The sprocket gearing is partially housed within a casing 286, which is preferably cast integral with the adjacent side of the table 8. The shaft 281 of the front lower feed roll carries the lower vertically disposed bevel pinion 275. The means for operating the variable speed mechanism controls the operation of the upper and lower feed rolls, which may be run either slow or fast, or reversed, but any other form of gearing may be employed for rotating the vertical shaft 267, which is connected with the upper and lower feed rolls.

The upper feed rolls are protected by a guard 283$^a$ of approximately inverted U-shape, consisting of substantially vertical sides and a lower horizontal portion, disposed transversely of the machine and arranged in advance of the lower portion of the upper feed rolls to prevent stock of too great a size for the capacity of the rolls, from entering the machine and straining or otherwise injuring the feed rolls, or roll pressure mechanism. The guard 283$^a$ is hung from the upper vertically movable bearing frames, which are provided with inwardly projecting ears 284$^a$, arranged in pairs and receiving between them the upper ends of the sides of the guard 283$^a$. The upper ends of the sides are secured to the ears by suitable fastening devices, and as the guard is carried by the upper bearing frames, it maintains a fixed position with relation to the upper feed rolls in all of the adjustments of the latter.

The outer portions of the upper halves of the band saw wheels are arranged within guards 285$^a$ and 286$^a$, preferably constructed of cast metal and suitably mounted on the base of the machine. The wheel guard 286$^a$ constitutes a support for an adjustable band saw guide 287, which is movable across the space between the columns, and which is operable from the front of the machine to arrange it at the desired point between the columns. The adjustable band saw guide is mounted on the inner end of a slide 288, disposed horizontally and arranged edgewise vertically and having beveled upper and lower edges 289 to fit a dove-tailed way 290 of the band saw guard 286$^a$. The band saw guard 286$^a$ is provided at the top with an extension having upper and lower horizontal flanges, which have oppositely inclined inner faces to provide the dove-tailed way 290. The slide is also provided adjacent to its end portions with inner and outer projecting lugs 291, on which are mounted eye bolts 292 for the attachment of a rope 293, or other suitable flexible connection, which is wound around a drum or spool 294. The spool or drum is mounted on the rear end of a shaft 295, which extends to the front portion of the machine, and which is provided at its front end with a hand wheel 296 for enabling it to be conveniently turned for moving the adjustable slide inwardly and outwardly. The flexible connection 293 extends in opposite directions from the spool or drum, and when the shaft is rotated, one of the end portions of the rope will be wound up on the said spool or drum, and the other will be unwound therefrom. That portion being wound on the spool or drum moves its attached end toward the same and actuates the slide 288. The adjustable saw guide is adapted to be moved across the saw table and is employed except when cutting very thin stock, when it is moved beyond the edge of the table. The shaft 295 is mounted at its rear end in a suitable bearing 297 at the top of the dove-tailed way, and it is supported near its front end by an arm 298, extending laterally from the outer face of the column 7, and terminating in a bearing.

The slide 288 is provided at its inner end with a foot 299, having a dove-tail way 300 at its lower face to receive an adjustable lower member 301 of the adjustable guide 287. The lower member, which is secured in its adjustment by set screws 301$^a$, is provided with a dove-tailed enlargement 302 slidable in the dove-tail way 300, and engaged by the set screws 301$^a$, and the said lower member has a knob or grip 303 to enable it to be readily moved backwardly or forwardly to arrange it properly with relation to the band saw, and also to enable the said lower member 301 to be readily detached, when it is desired to remove the band saw from or place the same on the band saw wheels. The band saw guide 287 is also provided with an adjustable upper member 304. The member 304, which is approximately L-shaped, has a vertically disposed portion 305 fitted against the inner end of the horizontal slide 288 and extending forwardly therefrom, and adjustably secured to the saw by means of a screw 306, mounted in a vertical slot 307 of the slide 288 and engaging a threaded perforation of the vertical portion of the upper member 304. The horizontally disposed portion of the upper member 304 extends forwardly from the slide, while the foot 299 projects rearwardly therefrom. The lower member 301 is provided with adjustable saw supporting screws 308, and the upper member carries adjustable saw-engaging pegs 309 and 310 for holding the band saw against downward or upward movement.

The band saw guard 285$^a$ has mounted on it a relatively stationary or non-adjustable tail band saw guide 311, composed of upper and lower members 312 and 313, which are adapted to be opened and closed to relieve the band saw, should the tail guide become clogged with a sliver or the like. The upper and lower members are provided with adjustable pegs 314 and 315, which are secured in their adjustment by means of set screws 316 and 317. The upper member 312 is formed integral with a bracket or plate 318, or otherwise secured to the guard 285$^a$, and provided with a sleeve or bearing 319 for a rock shaft 320. The lower member is provided at the back with an upwardly extending approximately semi-circular arm 321, terminating at its upper end in an eye 322, through which the outer end of the rock shaft or pivot 320 extends. The eye 322 fits between the outer end of the sleeve or bearing 319 and an upwardly projecting lug 323 of the upper member 312. The lug 323, which is arranged in spaced relation to the outer end of the sleeve or bearing 319, forms a solid abutment for the inner end 324 of the shaft or pivot 320. An upwardly extending inclined arm 325 is mounted on the outer end 326 of the shaft or pivot 320, which has its ends reduced, as shown, to fit the eye 322 of the lower member and a sleeve or laterally enlarged eye 327 of the arm 325. The arm is provided with a slightly curved slot 328, which receives a projecting pin or stud 329 of an oscillatory lever 330, and the latter is pivoted at its upper end 331 to a standard or support 332, and is adapted to be swung forwardly from the position illustrated in Fig. 36 of the drawings, to open the tail band saw guide. When the lever 330 is swung forwardly, the lower member of the tail band saw guide is swung downwardly, which will relieve the band saw should the tail guide become clogged. The standard or support, which extends upwardly from the top of the wheel guard 285$^a$, is provided at its bottom with flanges, forming a base, which is bolted, or otherwise secured to the wheel guard 285$^a$. The lever 330 is connected at an intermediate point by a pivot 333 to the rear end of an operating rod 334, which extends to the front of the machine. The operating rod, which is provided at its front end with a suitable grip or handle, is guided in an opening of a horizontal arm 335. The operating rod will enable the tail saw guide to be opened and closed by the operator, without leaving his position at the front of the machine. By mounting the adjustable saw guide and the tail saw guide on the wheel guards, the guides partake of the vibratory motion of the band saw wheels and the saw, and are enabled to operate more effectively in guiding the latter than they would were they mounted on or connected with the supports for the feeding mechanism as the latter partake of an entirely different vibratory motion from the band saw wheels. The wheel guard 285$^a$ is also provided with a dust chute, formed by the curved top of the dust guard and extending over the upper outer portion of the tail band saw wheel. The wheel guard is flared at the upper or inner end of the dust chute to provide an enlarged mouth or entrance 337, and it is provided at the lower end of the chute with a projecting tubular outlet, designed to be connected by a pipe or tube 338 with a suction fan or blower for removing the saw dust and refuse from the machine.

It will be seen, that while the upper and lower feed rolls are adjustable independently of each other and also independently of the table, they are carried by the table in the vertical adjustment thereof, that such vertical movement or adjustment of the table does not interfere with or affect the arrangement of the upper and lower feed rolls with relation to the table, and that when the machine is arranged for gage sawing, or sawing predetermined thicknesses from one side or face of the stock, the upper and lower rolls yieldably engage the lumber, so that the feeding action will not be affected by any inequalities of the material. Also it will be seen that the upper feed rolls are yieldably mounted on the upper bearing frames, and are also yieldable through the operation of the tension device, and that, furthermore, they are yieldable at different points throughout their length by reason of the cushioned rim sections, which constitute the engaging portions of the upper feed rolls. Furthermore, it will be clear that the bearings of the upper and lower feed rolls are adapted to be held rigid with the upper and lower bearing frames, so that, when the machine is arranged for center sawing, such operation will not be affected by any vertical movement of the feed rolls independent of the upper and lower bearing frames. Also, when the machine is arranged for center sawing, the tension device operates on both the upper and lower feed rolls and produces a uniform vertical movement of the same in opposite directions for causing crooked lumber to be accurately sawed through the center. The independent adjustment of the journal boxes at the ends of the feed rolls will enable them to be set at an inclination for cutting the material with a bevel.

The adjustment of the table may be rapidly effected through the power, which operates the machine, and the means for manually adjusting the table will enable an exceedingly fine and accurate adjustment to be obtained. The mechanism for adjusting the table rigidly holds the wedge-shaped frame or member against accidental movement and enables lumber to be positively sawed uniform thicknesses. The means for raising and lowering the table are also adapted to automatically move the sub-base inwardly and outwardly, for causing the rear feed rolls to clear the band saw wheels in an extreme adjustment of the table, and the sub-base is automatically moved inwardly to arrange the feed rolls close to the saw line, when the table is raised to a position adjacent to the band saw. The band saw guides are mounted on the wheel guards, and the tail band saw guide is adapted to be opened to relieve the band saw, should the tail guide become clogged, whereby the saw is prevented from becoming heated and expanding and run off the band saw wheels.

I claim to be the first to apply a self centering device to a horizontal band saw, although it has been done in a vertical saw, where the feed rolls do not support the material and the tension device is not subjected to the weight of the same.

Having thus fully described my invention, what I claim as new and desire to secure by Letters Patent, is:—

1. In a sawing machine, the combination with a horizontal band saw, of a lumber support or table, means for raising and lowering the table or support, and separate means for moving the table or support backwardly and forwardly during the upward and downward movements of the same.

2. In a sawing machine, the combination with a horizontal band saw, of a lumber support or table, means for raising and lowering the table or support, and separate means for automatically moving the table or support backwardly and forwardly simultaneously with the upward and downward movements of the same.

3. In a sawing machine, the combination with a horizontal band saw, of a table or support, means for raising and lowering the same, means for feeding the lumber to the saw, and separate means for moving the feeding means toward and from the saw during the upward and downward movements of the table or support.

4. In a sawing machine, the combination with a horizontal band saw, of a table or support, means for raising and lowering the same, means carried by the table or support in the upward and downward movements thereof for feeding the lumber to the saw, and separate means for moving the feeding means toward and from the saw during the upward and downward movements of the table or support.

5. In a sawing machine, the combination with a horizontal band saw, of a table or support, means for raising and lowering the same, feed rolls normally located above and below the same and movable with the table or support, and separate means for moving the feed rolls backwardly and forwardly to and from the vertical plane of the saw to clear the same during the upward and downward movements of the table or support.

6. In a sawing machine, the combination with a horizontal band saw, of a table or support, means for raising and lowering the same, feed rolls normally located above and below the saw and movable with the table or support, and means for moving the table or support backwardly and forwardly to carry the feed rolls to and from the vertical plane of the saw to cause the said feed rolls to clear the same, when the table or support is raised and lowered.

7. In a sawing machine, the combination with a horizontal band saw, and band saw wheels, of a table or support, means for raising and lowering the same, feed rolls movable with the table or support and normally extending into the vertical plane of the band saw wheels and the saw, and means for automatically moving the feed rolls beyond the plane of the band saw wheels and the saw when the table or support is lowered.

8. In a sawing machine, the combination with a horizontal band saw, of a table or support, means for raising and lowering the table or support, feed rolls movable with the table or support, and separate means operated automatically by the said means for moving the feed rolls toward and from the saw when the table or support is lowered.

9. In a sawing machine, the combination with a horizontal band saw, and band saw wheels, of upper and lower feeding means located above and below and normally extending into the vertical plane of the band saw and the band saw wheels, means for raising and lowering the feeding mechanism, and separate means for moving the feeding mechanism backwardly and forwardly to clear the band saw.

10. In a sawing machine, the combination with a horizontal band saw, and band saw wheels, of upper and lower horizontal feed rolls located above and below the band saw and normally extending into the vertical plane of the saw, means for raising and lowering the feeding mechanism, and separate means for moving the feed rolls backwardly and forwardly to clear the band saw.

11. In a sawing machine, the combination of a horizontal band saw, means for feeding the lumber to said saw, said feeding means being adjustable both toward and from said saw, means for adjusting said feeding means vertically, and separate means controlled by said vertically adjustable means for adjusting said feeding mechanism toward and from said saw.

12. In a sawing machine, the combination of a horizontal band saw, a table, means for adjusting the table vertically, and separate means for adjusting the table toward and from the said saw, feeding means carried by the table and adjustable therewith, and means for adjusting the said feeding means independently of the table.

13. In a sawing machine, the combination with a horizontal band saw, of upper and lower feeding means located above and below the saw line, a tension device connected with the upper feeding means, and means for connecting the lower feeding means with the tension device, and for disconnecting the lower feeding means from the tension device.

14. In a sawing machine, the combination with a horizontal band saw, of upper and lower feeding means located above and below the saw line, a tension device connected with the upper feeding means, means for connecting the lower feeding means with the tension device and for causing the said upper and lower feeding means to be uniformly actuated by the tension device, and means for adjusting the upper feeding means independently of the lower feeding means.

15. In a sawing machine, the combination with a horizontal band saw, of upper and lower feeding means located above and below the saw line, a tension device connected with the upper feeding means, means for connecting the lower feeding means with the tension device and for causing the upper and lower feeding means to move vertically uniform distances when actuated by the tension device, and means for raising and lowering the upper and lower feeding means simultaneously when the same are connected for center sawing.

16. In a sawing machine, the combination with a horizontal band saw, of upper and lower feed rolls located above and below the saw line, the lower feed roll also operating to support the material, a tension device normally connected with the upper feed roll, and means for connecting the lower feed roll with the tension device for causing the upper and lower feed rolls to be uniformly actuated in opposite directions by the tension device, means for disconnecting the lower feed roll from the said tension device, means for adjusting the upper feed roll independently of the lower feed roll, and means for raising and lowering the upper and lower feed rolls simultaneously to position the same for center sawing.

17. In a sawing machine, the combination with a horizontal band saw, of a table, means for raising and lowering the same, upper and lower feeding means located above and below the saw line and carried by the table in its upward and downward movements, a tension device also movable with the table and connected with the upper feeding means, means for connecting the lower feeding means with and disconnecting it from the tension device, and means for raising and lowering the upper feeding means independently of the table.

18. In a sawing machine, the combination with a horizontal band saw, of a table, means for raising and lowering the same, upper and lower feed rolls located above and below the saw line and movable with the table, a tension device mounted on the table and connected with the upper feed roll, means for connecting the lower feed roll with the tension device, and means for raising and lowering the upper feed roll independently of the table.

19. In a sawing machine, the combination with a horizontal band saw, of a table, means for raising and lowering the same, upper and lower feed rolls located above and below the saw line and movable with the table, a tension device mounted on the table and connected with the upper feed roll, and means for connecting the lower feed roll with the tension device and for causing the latter to impart a uniform movement to the upper and lower feed rolls.

20. In a sawing machine, the combination with a horizontal band saw, of upper and lower feeding means located above and below the saw line, the lower feeding means forming a support for the material, and means for centering the material including a tension device, and means embodying a pinion, and rack bars for connecting the tension device with both the upper and lower feeding means.

21. In a sawing machine, the combination with a horizontal band saw, of upper and lower feeding means located above and below the saw line, the lower feeding means forming a support for the material, and means for centering the material including a tension device, means embodying a pinion, and rack bars for connecting the tension device with both the upper and lower feeding means, and means for moving one of the rack bars into and out of mesh with the pinion to connect one of the feeding means with the tension device and for disconnecting it therefrom.

22. In a sawing machine, the combination of a horizontal band saw, a vertically adjustable table, and feeding means located above and below the saw line, the lower feeding means forming a support for the material, said feeding means being vertically adjustable with said table, and means carried by the table for centering the feeding mechanism with relation to the saw.

23. In a sawing machine, the combination of a horizontal band saw, a vertically adjustable table, feeding means located above and below the saw line, and means carried by the table for centering the feeding means with relation to the saw, said centering means including a shaft revolubly mounted in said table, and connections between said shaft and said feeding means.

24. In a sawing machine, the combination of a horizontal band saw, a vertically adjustable table, feeding means located above and below the saw line, and means carried by the table for centering the feeding means with relation to the saw, said centering means including a tension shaft, and connections between said shaft and said feeding means.

25. In a sawing machine, the combination of a horizontal band saw, a vertically adjustable table, feeding means located above and below the saw line, and means carried by the table for centering the feeding means with relation to the saw, said centering means including a shaft mounted in said table, and adjustable connections between said shaft and feeding means to vary the distance between the latter.

26. In a sawing machine, the combination of a horizontal band saw, a vertically adjustable table, adjusting feeding means located above and below the saw line, and means carried by the table for centering the feeding means with relation to the saw, said centering means including a shaft revolubly mounted in said table, and connections between said shaft and feeding means comprising adjusting screws.

27. In a sawing machine, the combination of a horizontal band saw, a vertically adjustable table, adjustable feeding means located above and below the saw line, and means carried by the table for centering the feeding means with relation to the saw, said centering means including a shaft revolubly mounted in said table, pinions on said shaft, rack bars which mesh with said pinions, and adjusting screws which connect said rack bars with said feeding means.

28. In a sawing machine, the combination of a horizontal band saw, a vertically adjustable table, upper and lower feeding means located above and below the saw line, and means carried by the table for centering the feeding means with relation to the saw, said centering means including a tension shaft revolubly mounted in said table, and connections between said shaft and feeding means comprising pinions on said tension shaft, and rack bars, respectively, connected to said upper and lower feeding means and which engage said pinions on opposite sides, the rack bar of the lower feeding means being movable out of engagement with the pinion.

29. In a sawing machine, the combination of a horizontal band saw, a vertically adjustable table, feeding means carried by and adjustable with said table and adjustable independently thereof and located above and below the saw line, and means for centering the feeding means with relation to the saw comprising a tension shaft revolubly mounted on said table, connections between said shaft and said feeding means, and means for adjusting said feeding means independently of said table.

30. In a sawing machine, the combination with a horizontal band saw, of feeding means located above and below the saw line, and means carried by the table for centering the feeding means with relation to the saw comprising a tension device, and means for connecting the tension device with the feeding means, said connecting means also forming adjusting means for raising and lowering the upper feeding means independently of the lower feeding means.

31. In a sawing machine, the combination with a horizontal band saw, of feeding means located above and below the saw line, the lower means forming a support for the material, means for centering the feeding means with relation to the saw including a tension device, and means for connecting the tension device with the feeding means, said connecting means embodying a rack bar and pinion, which constitute adjusting means for raising and lowering the feeding means.

32. In a sawing machine, the combination with a horizontal band saw, of upper and lower feeding means located above and below the saw line, the lower feeding means forming a support for the material, yieldable mountings for the feeding means, means for centering the feeding means with relation to the saw, said centering means including a tension device connected with the upper feeding means, means for connecting the lower feeding means with the tension device, and means for holding the mountings of the feeding means rigid when the machine is arranged for center sawing.

33. In a sawing machine, the combination with a horizontal band saw, of upper and lower feed rolls, one of the feed rolls having independently yieldable portions, means for rigidly connecting the yieldable portions, a tension device, and means for connecting the upper and lower feed rolls with the tension device for causing them to be uniformly actuated in opposite directions by the said tension device.

34. In a sawing machine, the combination with a horizontal band saw, of upper and lower feed rolls, a tension device, means for connecting the upper and lower feed rolls with the tension device to cause them to be uniformly actuated in opposite directions by the said tension device, and for disconnecting the lower feed rolls from the tension device for ordinary sawing.

35. In a sawing machine, the combination with a horizontal band saw, of upper and lower feed rolls, the upper feed roll being provided with independently yieldable portions, means for centering the feed rolls with relation to the band saw, and means for holding the said independently movable sections of the feed roll rigid when the machine is arranged for center sawing.

36. In a sawing machine, the combination with a horizontal band saw, of upper and lower horizontal feeding means, means for centering the upper and lower feeding means with relation to the saw, said centering means including a tension device provided with a weighted lever, a pinion, and rack bars for connecting the upper and lower feeding means with the tension device, means for moving one of the rack bars out of engagement with the pinion to disconnect the lower feeding means, and means for raising and lowering the upper feeding means independently of the lower feeding means.

37. In a sawing machine, the combination with a horizontal band saw, of upper and lower horizontal feeding means, means for centering the upper and lower feeding means with relation to the saw, said centering means including a tension device provided with a weighted lever, a pinion, and rack bars for connecting the upper and lower feeding means with the tension device, means for moving one of the rack bars out of engagement with the pinion to disconnect the lower feeding means, means for raising and lowering the upper feeding means independently of the lower feeding means, and means for relieving the upper feeding means of the weighted lever during the independent adjustment of the former.

38. In a sawing machine, the combination of a stationary base, band saw wheels mounted thereon, a horizontal band saw carried by the wheels, a sub-base slidable on the base, a table or support mounted on and carried by the sub-base, and means for sliding the sub-base backwardly and forwardly.

39. In a sawing machine, the combination of a stationary base, band saw wheels mounted thereon, a horizontal band saw carried by the wheels, a sub-base slidable on the base, feeding mechanism carried by the sub-base, and means for moving the sub-base backwardly and forwardly to carry the feeding means to and from the vertical plane of the saw.

40. In a sawing machine, the combination of a stationary base, band saw wheels mounted thereon, a horizontal band saw arranged on the wheels, a sub-base slidable on the base, a table or support mounted on and carried by the sub-base, feeding mechanism also carried by the sub-base, and means for moving the sub-base backwardly and forwardly to carry the feeding mechanism to and from the vertical plane of the band saw.

41. In a sawing machine, the combination with a horizontal band saw, and an adjustable band saw wheel, of yokes having upper and lower sides, bearings supporting the wheel and provided with upper and lower pivots slidable in the sides of the yokes, the upper pivots having threaded openings, and adjusting screws mounted upon the upper sides of the yokes and engaging the threaded openings of the upper pivots for raising and lowering the bearings.

42. In a sawing machine, the combination of a stationary base, band saw wheels mounted thereon, a horizontal band saw carried by the wheels, a sub-base slidable on the base, a table or support mounted on and carried by the sub-base, means for raising and lowering the table or support, and means for sliding the sub-base backwardly and forwardly.

43. In a sawing machine, the combination of a horizontal band saw, a stationary base having guides, a sub-base slidable on the base and interlocked with the guides, a table or support mounted on and carried by the sub-base, means for raising and lowering the table or support, and means for sliding the sub-base backwardly and forwardly.

44. In a sawing machine, the combination of a horizontal band saw, a stationary base, a sub-base slidable on the base, a table or support mounted on and carried by the sub-base, means for raising and lowering the table or support, and an adjusting screw connected with the base and with the sub-base for sliding the latter backwardly and forwardly.

45. In a sawing machine, the combination of a horizontal band saw, a stationary base, a sub-base slidable thereon, a table or support carried by the sub-base, means for raising and lowering the table or support, nuts mounted on the base and on the sub-base, and an adjusting screw having right and left hand threaded portions engaging the nuts for moving the sub-base backwardly and forwardly.

46. In a sawing machine, the combination of a horizontal band saw, a stationary base, a sub-base slidable thereon, a table or support mounted on and carried by the sub-base, an adjusting screw connected with the base and with the sub-base for sliding the latter and the table backwardly and forwardly, and gearing for operating the screw for actuating the sub-base.

47. In a sawing machine, the combination of a horizontal band saw, a stationary base, a sub-base slidable thereon, a table or support carried by the sub-base, a screw connected with the base and with the sub-base, a shaft having means for manually operating it, gearing connecting the shaft and the screw, and power actuated means for rotating the shaft.

48. In a sawing machine, the combination of a horizontal band saw, a stationary base, a sub-base slidable thereon, columns on the sub-base, a table guided by the columns, means for raising and lowering the table, and means for sliding the sub-base with the table backwardly and forwardly.

49. In a sawing machine, the combination of a horizontal band saw, columns, a vertically movable table guided on the columns, a frame or member slidable between the columns and having means for raising and lowering the table, and means for sliding the table backwardly and forwardly.

50. In a sawing machine, the combination of a horizontal band saw, columns, a vertically movable table guided on the columns, a slidable member having an inclined face for raising and lowering the table, and means for sliding the table backwardly and forwardly.

51. In a sawing machine, the combination of a horizontal band saw, a table, a slidable member having an inclined face for raising and lowering the table, and means for sliding the table backwardly and forwardly.

52. In a sawing machine, the combination of a horizontal band saw, a table having an inclined face, a slidable member supporting the said table and adapted to raise and lower the same, and means for sliding the said member and the table backwardly and forwardly.

53. In a sawing machine, the combination of a horizontal band saw, a table having an inclined face, a member provided with an inclined face receiving that of the table, said member being movable to raise and lower the table, and means for sliding the said member and the table backwardly and forwardly.

54. In a sawing machine, the combination of a horizontal band saw, vertical columns, a vertically movable table guided by the columns and having an inclined face, a wedge-shaped frame or member having an inclined face receiving the inclined face of the table, said frame or member being slidable to raise and lower the table, and means for sliding the frame or member and the table backwardly and forwardly.

55. In a sawing machine, the combination with a horizontal band saw, a saw, of a stationary base on which the saw is mounted, a slidable sub-base, a vertically movable table, a wedge-shaped frame or member slidable on the sub-base for raising and lowering the table, and means for sliding the sub-base with the table backwardly and forwardly.

56. In a sawing machine, the combination with a horizontal band saw, of a stationary base, a slidable sub-base, columns mounted on the sub-base, a vertically movable table guided on the columns, a wedge-shaped frame or member slidable between the columns for raising and lowering the table, and means for sliding the sub-base with the table backwardly and forwardly.

57. In a sawing machine, the combination with a horizontal band saw, of a stationary base, a slidable sub-base, columns mounted on the sub-base, a vertically movable table guided on the columns, a slidable wedge-shaped frame or member for raising and lowering the table, means for actuating the slidable frame or member, and means operated by the said means for moving the sub-base and the table backwardly and forwardly.

58. In a sawing machine, the combination of a horizontal band saw, a table, a movable member having an inclined face for raising and lowering the table, a nut mounted on the member, an adjusting screw for engaging the nut and actuating the said member, and means for sliding the said member and the table backwardly and forwardly.

59. In a sawing machine, the combination of a horizontal band saw, a table, a slidable member provided at opposite sides with inclined faces for supporting the table, spaced screws for actuating the slidable member, gears mounted on the screws, a shaft having worms meshing with the gears, and means for moving the said member and the table backwardly and forwardly.

60. In a sawing machine, the combination of a horizontal band saw, a table, a slidable member provided at opposite sides with inclined faces supporting the table, spaced adjusting screws for actuating the slidable member, gears mounted on the screws, a worm shaft having worms meshing with the gears, gearing for rotating the worm shaft, means for manually operating the latter, and means for moving the said member and the table backwardly and forwardly.

61. In a sawing machine, the combination of a horizontal band saw, a table, a slidable wedge-shaped member composed of opposite sides, and a connecting bottom portion, said member being provided at its sides with sockets and having openings extending through it, removable nuts fitted within the sockets, screws engaging the nuts and extending through the openings, and means for operating the screws.

62. In a sawing machine, a base, horizontal band saw mounted thereon, a sub-base slidably mounted on said base and movable toward and from said saw, a vertically adjustable table carried by said sub-base in the movement thereof toward and from the saw, and feeding means carried by said table and adjustable therewith.

63. In a sawing machine, a base, a horizontal band saw mounted thereon, a sub-base slidably mounted on said base and movable toward and from said saw, a vertically adjustable table carried by said sub-base in the movements thereof toward and from the saw, and feeding means carried by said table, said feeding means being adjustable independently of said table.

64. In a sawing machine, a base, a horizontal band saw mounted thereon, a sub-base comprising upright standards slidably mounted on said base and movable toward and from said saw, a table movable in corresponding vertical guides on the standards on said sub-base and carried by the latter in the movements thereof toward and from the saw, and feeding means carried by said table and movable therewith.

65. In a sawing machine, a base, a horizontal band saw mounted thereon, a sub-base movable backwardly and forwardly and comprising upright standards, a table carried by the sub-base in the backward and forward movements thereof, guides on said table which are fitted to and movable in corresponding vertical guides on said upright standards, and means for adjusting said table vertically, said means comprising a wedge slidably mounted on the sub-base.

66. In a sawing machine, a base, a horizontal band saw mounted thereon, a sub-base movable backwardly and forwardly and comprising upright standards, a table carried by the sub-base in the backward and forward movements thereof, guides on said table which are fitted to and movable in corresponding vertical guides on said upright standards, means for adjusting said table vertically, said means comprising a wedge slidably mounted on the sub-base, and means for imparting movement to said sub-base and wedge, respectively, in both directions for effecting adjustment of said table both vertically and toward and from said saw.

67. In a sawing machine, a base, a horizontal band saw mounted thereon, a sub-base movable backwardly and forwardly and comprising upright standards, a table carried by the sub-base in the backward and forward movements thereof, guides on said table which are fitted to and movable in corresponding vertical guides on said upright standards, means for adjusting said table vertically, said means comprising a wedge slidably mounted on the sub-base, and means for imparting movement to said sub-base and wedge, respectively, in both directions for effecting adjustment of said table both vertically and toward and from said saw, said means comprising screws connecting said base and sub-base and said sub-base and wedge, respectively.

68. In a sawing machine, the combination of a horizontal band saw, a stationary base, a slidable sub-base movable backwardly and forwardly, a table carried by the sub-base in the backward and forward movements thereof, means mounted on the sub-base for raising and lowering the table, gearing mounted on the base, and means for communicating motion from the said gearing to the means for raising and lowering the table, the latter means being arranged to permit the sliding of the sub-base.

69. In a sawing machine the combination of a horizontal band saw, a stationary base, a slidable sub-base movable backwardly and forwardly, a table carried by the sub-base in the backward and forward movements thereof, means mounted on the sub-base for raising and lowering the table, gearing mounted on the base, pulleys mounted, respectively, on the base and on the sub-base and connected with the gearing and with the means for raising and lowering the table, a belt arranged on the pulleys, and a belt tightening device engaging the belt.

70. In a sawing machine, the combination of a horizontal band saw, a stationary base, a sub-base slidable backwardly and forwardly thereon, a table carried by the sub-base in the backward and forward movements thereof, means mounted on the sub-base for raising and lowering the table, gearing mounted on the base for actuating the said means, a belt connecting the gearing with the said means, and an oscillatory member having an idler supported by one of the stretches of the belt.

71. In a sawing machine, the combination of a horizontal band saw, a stationary base, a slidable sub-base movable backwardly and forwardly, a table carried by the sub-base in the backward and forward movements thereof, means for raising and lowering the table, a screw for actuating the said means, gearing for operating the said sub-base, and means operated by the said screw for throwing the gearing into and out of operation.

72. In a sawing machine, the combination of a horizontal band saw, a sub-base movable backwardly and forwardly, a table carried by the same in the backward and forward movements thereof, means for raising and lowering the table, a screw for actuating the said means, mechanism for actuating the sub-base, a shifting device connected with such mechanism for starting and stopping the same, and a nut actuated by the said screw for operating the shifting device.

73. In a sawing machine, the combination of a horizontal band saw, a sub-base movable backwardly and forwardly, a table carried thereby in the backward and forward movements thereof, means for raising and lowering the table, mechanism for moving the sub-base, shifting means connected with the said mechanism for starting and stopping the same and having a shiftable lever, a screw for actuating the means for raising and lowering the table, and a nut operated by the screw and arranged to actuate the shiftable lever.

74. In a sawing machine, the combination of a stationary base, a horizontal band saw, feeding mechanism, a gear mounted on the base, a slidable sub-base carrying the feeding mechanism and movable backwardly and forwardly, mechanism for moving the sub-base having a gear, a shiftable device for carrying the latter into and out of engagement with the gear of the base, and means for operating the shifting device.

75. In a sawing machine, the combination of a horizontal band saw, a stationary base having a gear, a slidable sub-base movable backwardly and forwardly, mechanism for moving the sub-base having a gear, a shifting device for moving the latter gear into and out of engagement with the gear of the base and carried by the same in the backward and forward movements thereof, a table mounted on the sub-base, means for raising and lowering the table, a screw for actuating the latter means, and a nut actuated by the screw and arranged to operate the shifting device.

76. In a sawing machine, the combination of a horizontal band saw, a stationary base, a gear, a slidable sub-base movable backwardly and forwardly, mechanism for moving the sub-base having a gear for engaging the gear of the base, a shifting device for the said gears, a table carried by the sub-base in the backward and forward movements thereof, means for raising and lowering the table, a screw for actuating the latter means, a slidable nut actuated by the screw for operating the shifting device, and means for guiding the nut.

77. In a sawing machine, the combination of a stationary base, a horizontal band saw, feeding mechanism, a gear mounted on the base, a sub-base carrying the feeding mechanism and movable backwardly and forwardly, mechanism for actuating the sub-base having a gear for engaging the gear of the base, a shifting device provided with a lever, and a slidable member for operating the lever.

78. In a sawing machine, the combination of a stationary base, a horizontal band saw, feeding mechanism, a gear mounted on the base, a sub-base carrying the feeding mechanism and movable backwardly and forwardly, mechanism for actuating the sub-base having a gear for engaging the gear of the base, a shifting device provided with a lever, a slidable nut for operating the lever, and a screw for actuating the nut.

79. In a sawing machine, the combination of a stationary base, a horizontal band saw, feeding mechanism, a sub-base carrying the feeding mechanism and movable backwardly and forwardly, mechanism for actuating the sub-base having a gear for engaging the gear of the base, a shifting device, a guide, a nut slidable in the guide and provided with means for operating the shifting device, and a screw also operated in the guide for actuating the nut.

80. In a sawing machine, the combination of a horizontal band saw, feeding mechanism projecting within the vertical plane of the saw, means for raising and lowering the feeding mechanism, and means for moving the feeding mechanism into and out of the plane of the saw to permit the vertical adjustment of the feeding mechanism.

81. In a sawing machine, the combination of a horizontal band saw, feeding mechanism projecting within the vertical plane of the saw, means for raising and lowering the feeding mechanism, and means for moving the feeding mechanism out of the plane of the saw during the vertical adjustment of the feeding mechanism.

82. In a sawing machine, the combination of a horizontal band saw, feeding mechanism projecting within the vertical plane of the saw, means for raising and lowering the feeding mechanism, and means operable by the raising and lowering means for moving the feeding mechanism out of the plane of the saw during the vertical adjustment of the said feeding mechanism.

83. In a sawing machine, the combination of a horizontal band saw, a sub-base, feeding mechanism carried by the sub-base and projecting into the vertical plane of the saw, means for raising and lowering the feeding mechanism, and means for moving the sub-base to carry the feeding mechanism out of the plane of the saw to permit the vertical adjustment of the feeding mechanism.

84. In a sawing machine, the combination of a horizontal band saw, a sub-base, feeding mechanism carried by the sub-base and projecting into the vertical plane of the saw, means for raising and lowering the feeding mechanism, and means for moving the sub-base to carry the feeding mechanism out of the plane of the saw during the vertical adjustment of the feeding mechanism.

85. In a sawing machine, the combination of a horizontal band saw, a sub-base, feeding mechanism carried by the sub-base and projecting into the vertical plane of the saw, means for raising and lowering the feeding mechanism, and means operable by the raising and lowering means for moving the sub-base backward and forward to carry the feeding mechanism out of the plane of the saw during the vertical adjustment of the said feeding mechanism.

86. In a sawing machine, the combination of a stationary base, a horizontal band saw, feeding mechanism, a gear mounted on the base, a movable sub-base carrying the feeding mechanism, mechanism for actuating the sub-base having a gear for engaging that of the base, a shifting device for the said gears, a slidable nut having a projection provided with oppositely beveled portions for actuating the shifting device and having an intermediate portion for holding the shifting device to maintain the gears in engagement, and a screw for operating the nut.

87. In a sawing machine, the combination of a stationary base, a gear mounted thereon, a movable sub-base, mechanism for moving the sub-base having a gear for engaging that of the base, a shifting device for the said gears, a table mounted on the sub-base, means for raising and lowering the table, a screw for actuating the table, said screw being provided with a threaded extension, and a slidable nut actuated by the extension of the screw and arranged to operate the shifting device.

88. In a sawing machine, the combination of a stationary base, a horizontal band saw, feeding mechanism, a gear mounted on the base, a sub-base carrying the feeding mechanism and movable toward and from the saw, mechanism for actuating the sub-base having a laterally shiftable shaft provided with a gear carried into and out of engagement with the gear of the base by the lateral movement of the shaft, a shiftable member connected with the shaft, yieldable means located at opposite sides of the shaft and engaging the shiftable member, and means for operating the shiftable member.

89. In a sawing machine, the combination of a stationary base, a horizontal band saw, feeding mechanism, a gear mounted on the base, a sub-base carrying the feeding mechanism and movable toward and from the saw, mechanism for actuating the sub-base having a laterally movable shaft, a gear mounted on the shaft and carried into and out of engagement with the said gear by the lateral movement of the shaft, a shiftable member connected with the shaft, a slidable nut for automatically operating the shiftable member, a lever arranged in the path of the nut and connected with the shiftable member, and a screw for operating the nut.

90. In a sawing machine, the combination of a stationary base, a horizontal band saw, feeding mechanism, a gear mounted on the base, a sub-base carrying the feeding mechanism and movable toward and from the saw, mechanism for actuating the sub-base having a laterally movable shaft, a gear mounted on the shaft and carried into and out of engagement with the gear of the base by the lateral movement of the shaft, a combined guide and casing, a nut slidable in the combined guide and casing, a lever fulcrumed on the latter and arranged in the path of and automatically operated by the nut and connected with the shaft, and a screw for operating the nut.

91. In a sawing machine, the combination of a stationary base, a horizontal shaft, feeding mechanism, a gear mounted on the base, a sub-base carrying the feeding mechanism and movable toward and from the same, mechanism for moving the sub-base having a laterally movable shaft, a gear mounted on the shaft and carried into and out of engagement with the gear of the base by the lateral movement of the shaft, a shiftable member connected with the shaft, a combined guide and casing, a nut slidable in the combined guide and casing and having a projection, a lever connected with the shiftable member and arranged in the path of and automatically operated by the projection of the nut, and a screw for operating the nut.

92. In a sawing machine, the combination of a stationary base, a horizontal band saw, feeding mechanism, a gear mounted on the base, a sub-base carrying the feeding mechanism and movable toward and from the saw, mechanism for actuating the sub-base having a laterally movable shaft, a gear mounted on the shaft and carried into and out of engagement with the gear of the base by the lateral movement of the shaft, a combined guide and casing having a longitudinal slot, a nut slidable in the combined guide and casing and having a projection extending through the slot, a lever arranged in the path of and automatically operated by the projection and connected with the shaft, and a screw for operating the nut.

93. In a sawing machine, the combination of a stationary base, a horizontal band saw, feeding mechanism, a gear mounted on the base, a sub-base carrying the feeding mechanism and movable toward and from the saw, mechanism for actuating the sub-base having a laterally movable shaft, a gear mounted on the shaft and carried into and out of engagement with the said gear by the lateral movement of the shaft, a shiftable member connected with the shaft and having projecting lugs, springs engaging the lugs for holding the gear of the shaft out of engagement with that of the base, an adjusting device mounted on one of the lugs and engaging one of the springs, and means for automatically operating the shiftable member.

94. In a sawing machine, the combination with a horizontal band saw, of a table located beneath the same, means for raising and lowering the table toward and from the saw, lower bearing frames movable on the table, upper bearing frames, guiding means separate from the table for the upper bearing frames, upper and lower horizontal feed rolls mounted in the said bearing frames, a tension device carried by the table and connected with the upper bearing frames, and means for also connecting the lower bearing frames with the tension device.

95. In a sawing machine, the combination with a horizontal band saw, of a main frame, a table located beneath the saw, means for raising and lowering the table toward and from the saw, upper bearing frames guided on the main frame, lower bearing frames guided on the table, upper and lower horizontal feed rolls mounted in the upper and lower bearing frames, and a tension device mounted on the table and connected with the upper and lower bearing frames and also constituting means for adjusting the upper feed rolls with relation to the table.

96. In a sawing machine, the combination with a horizontal band saw of a main frame, a vertically adjustable table mounted below the saw and movable toward and from the same, upper bearing frames slidable on the main frame, lower bearing frames movably mounted on the table, horizontal feed rolls carried by the upper and lower bearing frames, a tension device mounted on the table and embodying a rack bar and pinion, the rack bar being connected with the upper bearing frames, and a separate rack bar for connecting the lower bearing frames with the tension device.

97. In a sawing machine, the combination with a horizontal band saw, and a main frame, of a vertically movable table guided on the main frame and mounted below and movable toward and from the saw, a lower bearing frame, an upper bearing frame also guided on the main frame, horizontal feeding means carried by the upper and lower bearing frames, a tension device embodying a rack bar and pinion, the rack bar being adjustably connected with the upper bearing frame, a separate rack bar for connecting the lower bearing frame with the tension device, and means for rotating the pinion independently of the tension device for adjusting the feeding means with relation to the table.

98. In a sawing machine, the combination with a band saw, of a table provided at opposite sides with dove-tailed ways and located below the saw, means for moving the table vertically toward and from the saw, lower horizontal feeding means, lower frames slidably interlocked with the dovetailed ways and carrying the lower feeding means, upper horizontal feeding means coöperating with the lower feeding means, and means for connecting the upper and lower feeding means to move the same either together and with the table in the adjustment thereof or simultaneously in opposite directions.

99. In a sawing machine, the combination with a horizontal band saw, and upper and lower horizontal feeding means, of a table located beneath the saw and movable vertically toward and from the same, a tension device carried by the table and connected with the upper feeding means and embodying a rack bar and pinion, a rack bar being connected with the lower feeding means, and an eccentric for moving the rack bar into and out of engagement with the pinion.

100. In a sawing machine, the combination with a horizontal band saw, of a table, upper and lower horizontal feeding means, a tension device mounted on the table and embodying a pinion, a long rack bar connected with the upper feeding means and meshing with the pinion, a short rack bar connected with the lower feeding means and arranged to be moved into and out of mesh with the pinion, and means for raising and lowering the table to position the upper and lower feeding means equal distances from the saw.

101. In a sawing machine, the combination with a horizontal band saw of a main frame, a vertically adjustable table located beneath the saw and movable toward and from the same, upper bearing frames slidable on the main frame, lower bearing frames mounted on the table, upper and lower horizontal feed rolls carried by the bearing frames and connected together to move simultaneously in opposite directions, a vertical shaft mounted on the main frame, and gearing slidable on the vertical shaft and connecting the same with the feed rolls.

102. In a sawing machine, the combination with a horizontal band saw of a main frame, a vertically adjustable table located beneath the saw and movable toward and from the same, upper and lower bearing frames mounted, respectively, on the main frame and on the table, upper and lower horizontal feed rolls carried by the bearing frames and connected together to move simultaneously in opposite directions, a vertical shaft journaled on the main frame, gearing slidable on the vertical shaft and connecting the same with the feed rolls, and casings receiving the said gearing and connected with the bearings of the feed rolls, said casings being movable on the vertical shaft with the gearing.

103. In a sawing machine, the combination with a horizontal band saw, and band saw wheels, of a wheel guard provided with a curved top portion forming a dust chute and extending over the upper outer portion of the adjacent band saw wheel, said guide being enlarged and flared at the upper end of the dust chute to form an entrance opening and having a tubular outlet at the lower end of the chute.

104. In a sawing machine, the combination with a horizontal band saw, of a table, a feed roll arranged above the table, a tension device connected with the feed roll to urge the same toward the table, the said tension device being located below the table and the arrangement being such that a free space above the feed roll is left clear to enable the feed roll to form a conveyer to carry the material from the back of the machine to the front thereof.

105. In a sawing machine, the combination with a horizontal band saw, of spaced columns, a table movable vertically between the columns, a feed roll, a tension device connected with the feed roll for urging the same toward the table, said tension device being located below the table and the arrangement being such that a free space above the feed roll is left clear to enable the feed roll to form a conveyer to carry the material from the back of the machine to the front thereof.

106. In a sawing machine, the combination with a horizontal band saw, of a slidable sub-base having spaced columns, a vertically movable table guided between the columns and carried by the sub-base, a feed roll, and a tension device connected with the feed roll to urge the same toward the table, said tension device being located beneath the table and the arrangement being such that a free space above the feed roll is left clear to enable the feed roll to form a conveyer for carrying the material from the back of the machine to the front thereof.

107. In a sawing machine, the combination with a horizontal band saw, of horizontal feeding means, a tension device located below said feeding means, and connections between said tension device and said feeding means outside of the operative portions thereof, whereby the space above the feeding means will be unobstructed to permit returning the stock to the front of the machine over the top of said feeding means.

108. In a sawing machine, the combination with a horizontal band saw of a table, horizontal feeding means, a tension shaft revolubly mounted in said table below said feeding means, and connections between said tension shaft and feeding means outside of the operative portions thereof, whereby the space above the feeding means will be unobstructed to permit returning of the stock to the front of the machine over the top of said feeding means.

109. In a sawing machine, the combination with a horizontal band saw, of upper and lower feeding means located above and below the saw line, said saw and feeding means having relative vertical adjustments, the lower feeding means forming a support for the material, and centering means for automatically adjusting the upper and lower feeding means independent of the said vertical adjustments to maintain the feeding means equi-distant from the sides of the saw so that the latter will be in a central position with relation to the feeding means for cutting the material through the center.

110. In a sawing machine, the combination with a band saw, of upper and lower vertically adjustable feeding means located above and below the saw line, the lower feeding means forming a support for the material, and means independent of the said vertical adjustment for automatically adjusting the feeding means to maintain the same equi-distant from the sides of the saw to cut a piece of material through the center.

111. In a sawing machine, the combination with a horizontal band saw, of upper and lower feeding means located above and below the saw line, the lower feeding means forming a support for the material, means for adjusting the feeding means for arranging the same equi-distant from the sides of the saw, and means independent of the first adjustment for automatically maintaining the said feeding means in such position with relation to the saw to cut a piece of material through the center.

112. In a sawing machine, the combination with a horizontal band saw, of a vertically adjustable table, upper and lower feeding means carried by the table in the adjustment thereof and located above and below the saw line, means independent of the said vertical adjustment for automatically adjusting the feeding means for maintaining the same equi-distant from the sides of the saw to cut a piece of material through the center, means for disengaging the lower feeding means from coöperative relation with the upper feeding means, and means for securing the said lower feeding means to the table in fixed adjustment.

113. In a sawing machine, the combination with a horizontal band saw, and band saw wheels, of wheel guards, an adjustable band saw guide mounted on one of the wheel guards, and a tail band saw guide supported by the other wheel guard.

114. In a sawing machine, the combination with a horizontal band saw, of upper and lower feeding means located above and below the saw line, the lower feeding means forming a support for the material, a tension device connected with the upper feeding means, means for connecting the lower feeding means with the tension device and for causing the upper and lower feeding means to move vertically uniform distances in opposite directions when actuated by the tension device, and separate means for moving the upper and lower feeding means simultaneously in the same direction.

115. In a sawing machine, the combination with a horizontal band saw of a table, means for raising and lowering the same, upper and lower feeding means normally carried by the table in its upward and downward movements and located above and below the saw line, the lower feeding means forming a support for the material, and means for locking the upper feeding means to permit an independent adjustment of the table and the lower feeding means.

116. In a sawing machine, the combination with a horizontal band saw of a table, means for raising and lowering the same, upper and lower feeding means located above and below the saw line and normally carried by the table in its adjustment, the lower feeding means forming a support for the lumber a tension device, means for connecting the same with the upper and lower feeding means and for disconnecting it therefrom, and means for holding the upper feeding means against movement to permit an independent adjustment of the table and the lower feeding means.

117. In a sawing machine, the combination of a table, means for raising and lowering the same, upper and lower feeding means normally carried by the table, means for raising and lowering the upper feeding means independently of the table and the lower feeding means, and means for holding the said upper feeding means against movement to permit an independent adjustment of the table and the lower feeding means.

118. In a sawing machine, the combination with a horizontal band saw, of upper and lower feeding means located above and below the saw line, a tension device, means for connecting the tension device with and for disconnecting the same from the upper and lower feeding means, means for raising and lowering the upper and lower feeding means simultaneously, and means for holding the upper feeding means against movement to permit an independent adjustment of the lower feeding means.

119. In a sawing machine, the combination with a horizontal band saw of a table, upper and lower feeding means located above and below the saw line, a tension device mounted on the table, means for connecting the tension device with and for disconnecting it from the upper and lower feeding means, means for holding the upper feeding means against movement, and means for adjusting the table and the lower feeding means independently of the upper feeding means.

120. In a sawing machine, the combination with a horizontal band saw of a table, upper and lower feeding means located above and below the saw line, a tension device mounted on the table, means for connecting the tension device with and for disconnecting it from the upper and lower feeding means, means for holding the upper feeding means against movement, means for adjusting the table and the lower feeding means independently of the upper feeding means, and means for raising and lowering the table and the upper and lower feeding means simultaneously.

121. In a sawing machine, the combination with a horizontal band saw of a vertically adjustable table, upper and lower feeding means located above and below the saw line and carried by and adjustable with said table, a tension shaft revolubly mounted in said table, connection between said tension shaft and said feeding means, means for disengaging said lower feeding means from said tension shaft, and means for securing said lower feeding means to said table in fixed adjustment.

122. In a sawing machine, the combination with a supporting base and a horizontal band saw, of upright standards thereon, a table, said table and upright standard being provided with engaging vertical ways in which said table is vertically adjustable, upper and lower feeding means located above and below the saw line, slides for upper feeding means fitted to and vertically movable in suitable guide ways on said upright standards, slides for lower feeding means fitted to and vertically movable on guides on said table, a shaft revolubly mounted in said table, connection between said shaft and said slides, said connection comprising pinions on said shaft, rack bars connected to said slides which mesh with the pinions on said shaft, and means for disengaging the rack bars connected to the slides of one set of feeding means from said pinions and means for securing said disengaged slides to said table in rigid adjustment.

123. In a sawing machine, the combination with a horizontal band saw, of upper and lower feeding means located above and below the saw line, means for adjusting the upper and lower feeding means independently of each other, means for simultaneously moving the feeding means in the same direction, and a tension device connected with the upper and lower feeding means for simultaneously moving the same in opposite directions.

124. In a sawing machine, the combination with a horizontal band saw, of upper and lower feeding means located above and below the saw line, means for adjusting the upper and lower feeding means independently of each other, means for simultaneously moving the feeding means in the same direction, a tension device, and means for connecting the tension device with the upper and lower feeding means for simultaneously moving the same in opposite directions uniform distances to maintain the saw in a central position with relation to the feeding means.

125. In a sawing machine, the combination with a horizontal band saw, of automatically operable means forming a support for the material and movable upwardly and downwardly for centering the same with relation to the saw to cut the material through the center, said means including a tension device arranged to counter-balance the weight of the material.

126. In a sawing machine, the combination with a horizontal band saw, of upper and lower horizontal feeding means, the lower feeding means forming a support for the material, and automatically operable means for centering the feeding means with relation to the saw for cutting the material through the center said means including a tension device arranged to counter-balance the weight of the material.

127. In a sawing machine, the combination with a horizontal band saw, of upper and lower horizontal feeding means, the lower feeding means forming a support for the material, automatically operable means for centering the feeding means with relation to the saw for cutting the material through the center, said centering means including a tension device arranged to counter-balance the weight of the material, and means for adjusting the feeding means.

128. In a sawing machine, the combination with a horizontal band saw, of upper and lower horizontal feeding means, the lower feeding means forming a support for the material, means for centering the feeding means with relation to the saw for cutting the material through the center, said centering means including a tension device, means for disconnecting the lower feeding means, and means for adjusting the upper feeding means independently of the lower feeding means.

129. In a sawing machine, the combination with a horizontal band saw, of upper and lower feeding means, the lower feeding means forming a support for the material, and means for centering the feeding means with relation to the saw to cut the material through the center, said centering means including a tension device, and means for connecting the same with the feeding means for simultaneously moving the upper and lower feeding means in opposite directions uniform distances, and means for simultaneously moving the upper and lower feeding means in the same direction.

130. In a sawing machine, the combination with a horizontal band saw, of upper and lower feeding means, the lower feeding means forming a support for the material, and means for centering the feeding means with relation to the saw to cut the material through the center, said centering means including a tension device, and means for connecting the same with the feeding means for simultaneously moving the upper and lower feeding means in opposite directions uniform distances, means for simultaneously moving the upper and lower feeding means in the same direction, and means for raising and lowering the upper feeding means independently of the lower feeding means.

131. In a sawing machine, the combination with a horizontal band saw, of upper and lower feeding means, the lower feeding means forming a support for the material, and means for centering the feeding means with relation to the saw to cut the material through the center, said centering means including a tension device, and means for connecting the same with the feeding means for simultaneously moving the upper and lower feeding means in opposite directions uniform distances, means for simultaneously moving the upper and lower feeding means in the same direction, means for disconnecting the lower feeding means from the centering means, means for raising and lowering the upper feeding means independently of the lower feeding means, and means for relieving the upper feeding means of the tension device during the separate adjustment of the former.

132. In a sawing machine, the combination with a horizontal band saw, of a vertically movable table, upper and lower feeding means movable with the table, means for centering the feeding means with relation to the saw, said centering means including a tension device also carried by the table, and means for connecting the feeding means with the tension device for simultaneously moving the upper and lower feeding means in opposite directions, and means for adjusting the table to raise and lower the upper and lower feeding means simultaneously.

133. In a sawing machine, the combination with a horizontal band saw, of a vertically movable table, a tension device, upper and lower feeding means connected with the tension device, the lower feeding means forming a support for the material, which is counter-balanced by the tension device, and means for adjusting the upper and lower feeding means simultaneously and for also adjusting the same independently of each other.

134. In a sawing machine, the combination with a horizontal band saw, of a vertically movable table, upper and lower horizontal feed rolls, a tension device connected with the upper feed roll and mounted on the table below the top thereof so as to leave the space above the upper feed roll free to enable the said upper feed roll to form a conveyer for carrying the lumber from the back of the machine to the front thereof, and operating mechanism mounted on the table and located beneath the top thereof and connected with the upper feed roll for raising and lowering the same.

135. In a sawing machine, the combination with a horizontal band saw, of a vertically movable table, upper and lower horizontal feed rolls located above and below the saw line, means for centering the feed rolls with relation to the saw, said centering means including a tension device located above the top of the table so as to leave the space above the upper feed roll clear to permit the said upper feed roll to form a conveyer for carrying the lumber from the back of the machine to the front thereof, means for disconnecting the lower feed roll from the centering device, and operating mechanism connected with the upper feed roll for raising and lowering the same when the lower feed roll is disconnected from the centering device.

136. In a sawing machine, the combination with a horizontal band saw, of a vertically movable table, upper and lower horizontal feed rolls carried by the table in the vertical movement thereof, means for centering the feed rolls with relation to the saw to cut the material through the center, said centering means including a tension device, and mechanism for adjusting the feed rolls, said tension device and adjusting mechanism being located below the top of the table to leave the upper feed roll clear, whereby the said upper feed roll is adapted to operate as a conveyer for returning the material to the front of the machine.

137. In a sawing machine, the combination with a horizontal band saw, of a vertically movable table, upper and lower horizontal feed rolls located above and below the saw line, the upper feed roll being movable vertically independently of the table, and a tension device mounted on the table and connected with the upper feed roll for operating the latter and also for causing the said upper feed roll to move vertically with the table in the adjustments thereof.

138. In a sawing machine, the combination with a horizontal band saw, of a sub-base provided with guides, a table movable upwardly and downwardly in the guides, upper feeding means also guided on the sub-base and movable independently of the table, and a tension device carried by the table and connected with the upper feeding means for operating the same and for also causing the said upper feeding means to move with the table in the adjustments thereof.

139. In a sawing machine, the combination with a base, of band saw wheels mounted thereon, a band saw, wheel guards also connected with the base, spaced saw guides mounted on the wheel guards and receiving the band saw, a movable sub-base, a table mounted on the sub-base, and feeding means also carried by the said sub-base.

140. In a sawing machine, the combination with a horizontal band saw, of upper and lower feeding means, the lower feeding means forming a support for the material, means for centering the feeding means with relation to the saw to cut the material through the center, said centering means including a tension device, and means for connecting the same with the feeding means for simultaneously moving the upper and lower feeding means in opposite directions uniform distances, means for simultaneously moving the upper and lower feeding means in the same direction, means for raising and lowering the upper feeding means independently of the lower feeding means, and means for relieving the upper feeding means of the tension device during the separate adjustment of the former.

141. In a sawing machine, the combination with a horizontal band saw, of upper and lower horizontal feeding means, the lower feeding means forming a support for the material, means for centering the feeding means with relation to the saw for cutting the material through the center, said centering means including a tension device, means for adjusting the upper feeding means independently of the lower feeding means, and means for relieving the upper feeding means of the tension device during the separate adjustment of the former.

142. In a sawing machine, the combination with a horizontal band saw, and a horizontal table located below the saw and movable toward and from the same, of upper and lower feed rolls, a tension device, carried by the table, and means for connecting the upper and lower feed rolls with the tension device for causing them to be uniformly actuated in opposite directions by the said tension device.

143. In a sawing machine, the combination with a horizontal band saw, of a vertically movable table, a tension device, upper and lower feeding means connected with the tension device, the lower feeding means forming a support for the material, which is counter-balanced by the tension device.

144. In a sawing machine, the combination with a horizontal band saw, of a table located beneath the same, means for adjusting the table toward and from the saw, upper and lower feed rolls supported above and below the table, means for moving the feed rolls vertically simultaneously with the adjustment of the table, and means for moving the feed rolls in opposite directions independently of the table.

145. In a sawing machine, the combination with a horizontal band saw, of upper and lower feed rolls, adjustable bearings for the same, a tension device, means for connecting the upper and lower bearings with the tension device for causing them to be uniformly actuated in opposite directions for center sawing, means for disconnecting the lower bearings from the tension device, a spring, adjusting means connecting the spring with the bearings, and separate adjusting means for controlling the tension of the spring and for relieving the feed rolls of the spring for solidly mounting the feed rolls for center sawing.

146. In a sawing machine, the combination with a horizontal band saw, of upper and lower feed rolls, adjustable bearings for the same, a tension device, means for connecting the upper and lower bearings with the tension device for causing them to be uniformly actuated in opposite directions for center sawing, means for disconnecting the lower bearings from the tension device, a spring, adjusting screws connecting the bearings with the ends of the spring, and an intermediate adjusting screw for controlling the tension of the spring, said screws being also adjustable to relieve the feed rolls of the spring for solidly mounting the said feed rolls for center sawing.

147. In a sawing machine, the combination with a horizontal band saw, of opposite upper and lower bearing frames provided with ways, bearings slidable in the ways, upper and lower feed rolls mounted in the bearings, a tension device, means for connecting the upper and lower bearing frames with the tension device and for disconnecting the lower bearing frames therefrom, adjusting screws mounted in the bearing frames and connected with the bearings for adjusting the same, springs connected with the adjusting screws for yieldably holding the feed rolls against the lumber, and means for controlling the tension of the springs and for relieving the feed rolls of the springs for solidly mounting the feed rolls for center sawing.

In testimony, that I claim the foregoing as my own, I have hereto affixed my signature in the presence of two witnesses.

FRANCIS THOMAS McDONOUGH.

Witnesses:
 CHAS. F. CAMPBELL,
 JAMES W. HUBBARD.